(12) United States Patent
Svetal

(10) Patent No.: US 10,706,249 B1
(45) Date of Patent: Jul. 7, 2020

(54) ASSISTED IDENTIFICATION OF AMBIGUOUSLY MARKED OBJECTS

(71) Applicant: Datalogic USA, Inc., Eugene, OR (US)

(72) Inventor: Michael Svetal, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 16/234,682

(22) Filed: Dec. 28, 2018

(51) Int. Cl.
| G06K 15/00 | (2006.01) |
| G06K 7/14  | (2006.01) |
| G06K 7/10  | (2006.01) |
| G06F 9/38  | (2018.01) |
| G07G 1/00  | (2006.01) |

(52) U.S. Cl.
CPC ......... *G06K 7/1473* (2013.01); *G06F 9/3861* (2013.01); *G06K 7/10861* (2013.01); *G06K 7/1443* (2013.01); *G07G 1/0045* (2013.01)

(58) Field of Classification Search
USPC .................................... 235/383, 385, 462.07
See application file for complete search history.

(56) References Cited

U.S. PATENT DOCUMENTS

| 5,880,451 | A | 3/1999 | Smith et al. |
| 6,510,989 | B1 | 1/2003 | Ortega |
| 6,711,293 | B1 | 3/2004 | Lowe |
| 6,712,268 | B1 * | 3/2004 | Mason ............... G06Q 30/0283 |
| | | | 235/383 |
| 6,744,938 | B1 | 6/2004 | Rantze et al. |
| 7,010,501 | B1 | 3/2006 | Roslak et al. |
| 7,209,891 | B1 | 4/2007 | Addy et al. |
| 7,472,081 | B1 | 12/2008 | Cason |
| 8,746,564 | B2 | 6/2014 | Olmstead et al. |
| 8,939,369 | B2 | 1/2015 | Olmstead et al. |
| 9,082,142 | B2 | 7/2015 | Svetal |
| 10,055,626 | B2 | 8/2018 | Beghtol et al. |
| 2006/0255130 | A1 * | 11/2006 | Whewell ............... G07D 7/004 |
| | | | 235/383 |
| 2007/0250430 | A1 * | 10/2007 | Sholtis ............... G06Q 30/0603 |
| | | | 705/37 |
| 2008/0133335 | A1 | 6/2008 | Ullah |
| 2009/0039164 | A1 | 2/2009 | Herwig et al. |
| 2009/0088203 | A1 * | 4/2009 | Havens ............... G06K 7/10881 |
| | | | 455/556.1 |
| 2011/0286628 | A1 | 11/2011 | Goncalves et al. |
| 2012/0187195 | A1 | 7/2012 | Actis et al. |
| 2012/0203647 | A1 | 8/2012 | Smith |
| 2013/0020391 | A1 | 1/2013 | Olmstead et al. |

(Continued)

*Primary Examiner* — Tuyen K Vo
(74) *Attorney, Agent, or Firm* — The Juhasz Law Firm

(57) ABSTRACT

A scanning device includes: an image sensor configured to capture at an indicia image of an indicia carried on a surface of the object and an object image of a different portion of the object, wherein the indicia encodes an identifier of the object; and a processor. The processor is to: interpret the indicia to decode the identifier of the object therefrom; in response to a successful decode, transmit the identifier to a store database server for the store database server to correlate the identifier to a price at which the object is to be sold and to respond with the price; in response to a failure to obtain the price based on the indicia, transmit the at least one image to an exception handling server for the exception handling server to respond with the price; receive the price; and visually present the price to enable selling the object.

20 Claims, 11 Drawing Sheets

(56) References Cited

U.S. PATENT DOCUMENTS

| | | | |
|---|---|---|---|
| 2013/0066733 A1* | 3/2013 | Levy | G06Q 30/06 |
| | | | 705/16 |
| 2013/0175339 A1 | 7/2013 | Svetal | |
| 2013/0332273 A1* | 12/2013 | Gu | G06O 30/0205 |
| | | | 705/14.53 |
| 2015/0095189 A1* | 4/2015 | Dharssi | G07G 1/0063 |
| | | | 705/26.8 |
| 2015/0186862 A1* | 7/2015 | Itani | G07G 1/0036 |
| | | | 705/23 |
| 2015/0193781 A1 | 7/2015 | Dave et al. | |
| 2016/0104189 A1* | 4/2016 | Marcus | G06Q 30/0234 |
| | | | 705/14.34 |
| 2016/0364711 A1* | 12/2016 | Anderson | G06Q 20/201 |
| 2017/0255898 A1* | 9/2017 | Thomas | G06Q 10/087 |
| 2017/0293959 A1* | 10/2017 | Itou | G06Q 30/0623 |
| 2018/0285848 A1* | 10/2018 | Crooks | G06Q 20/201 |

\* cited by examiner

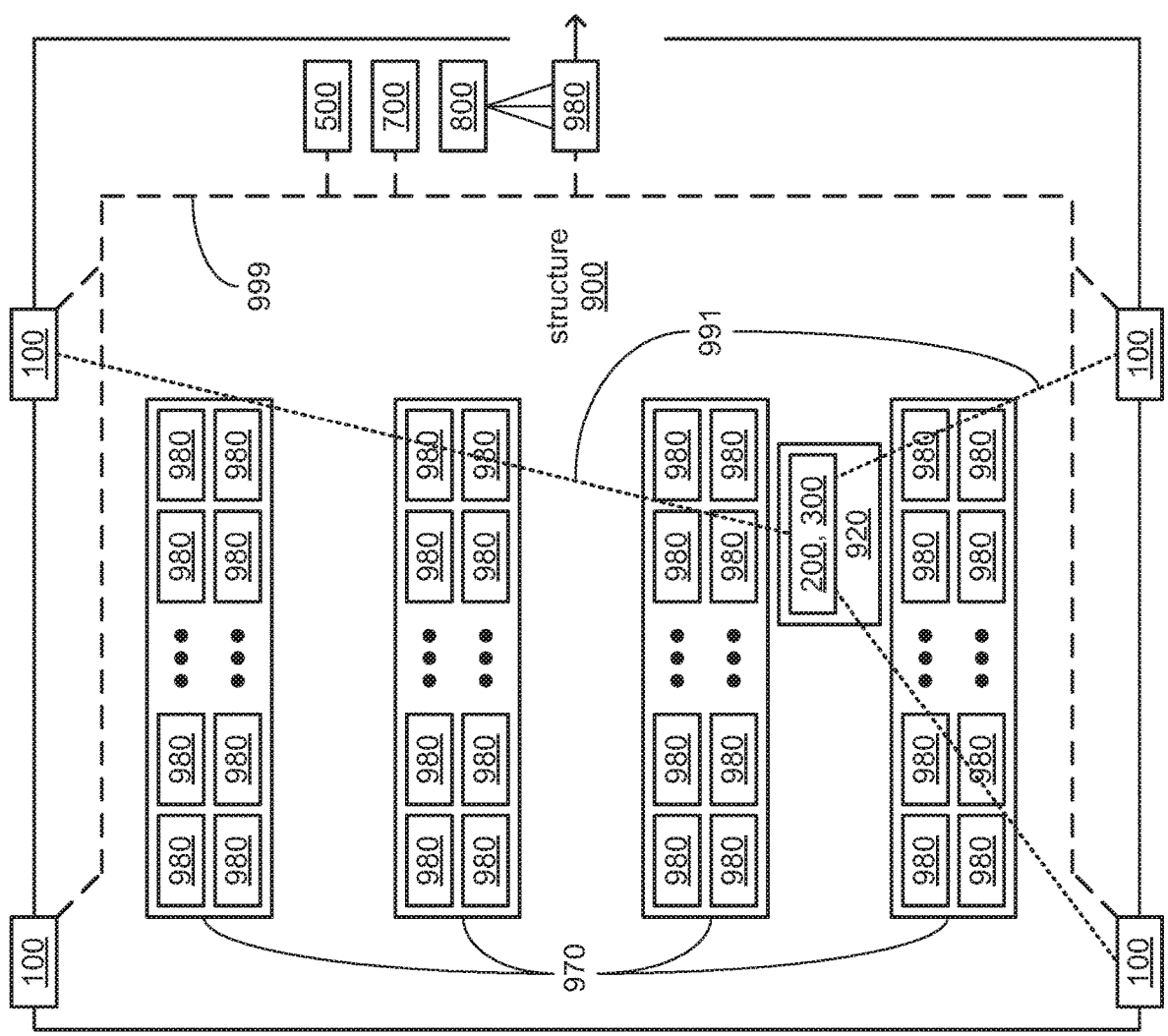

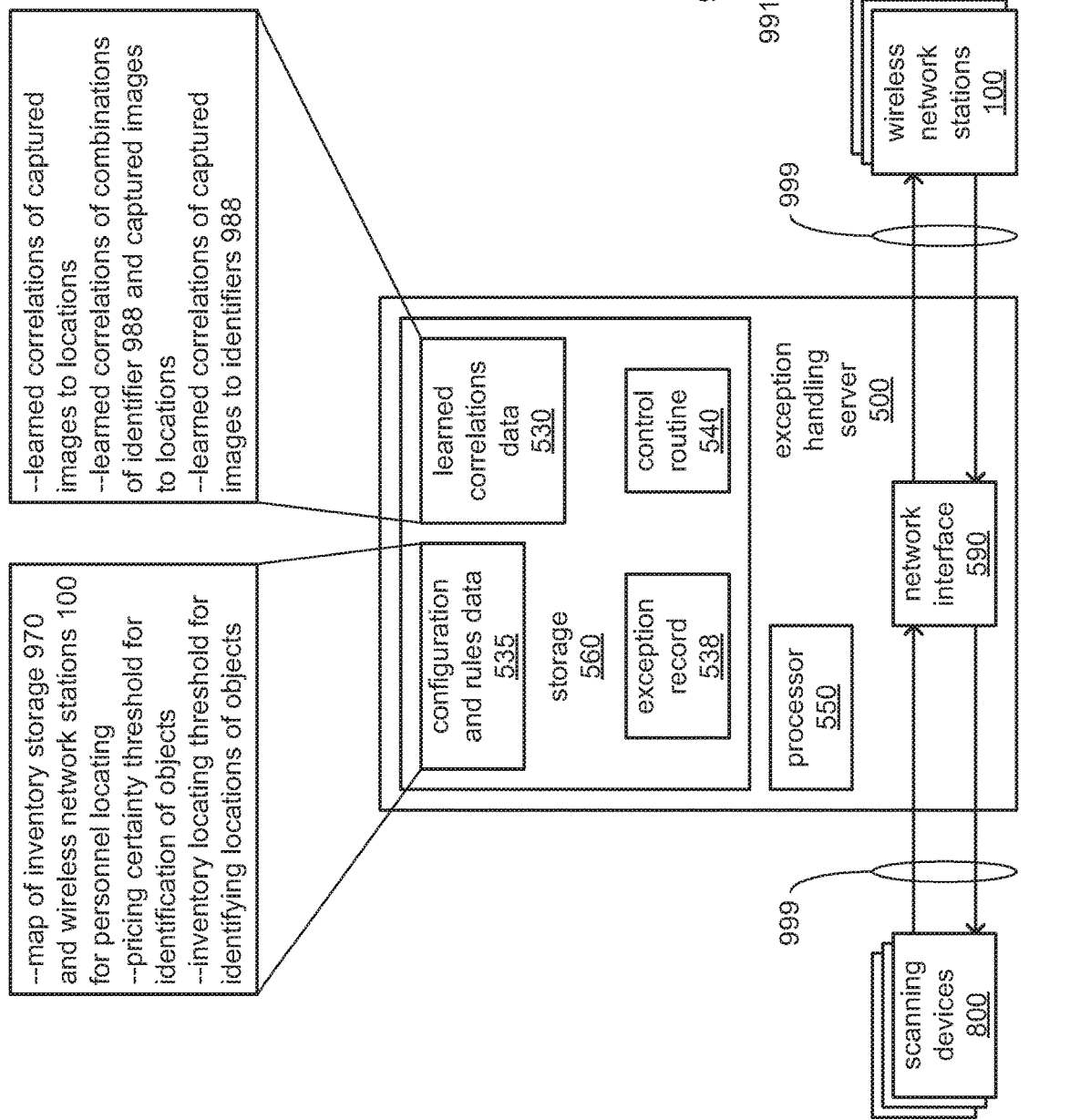

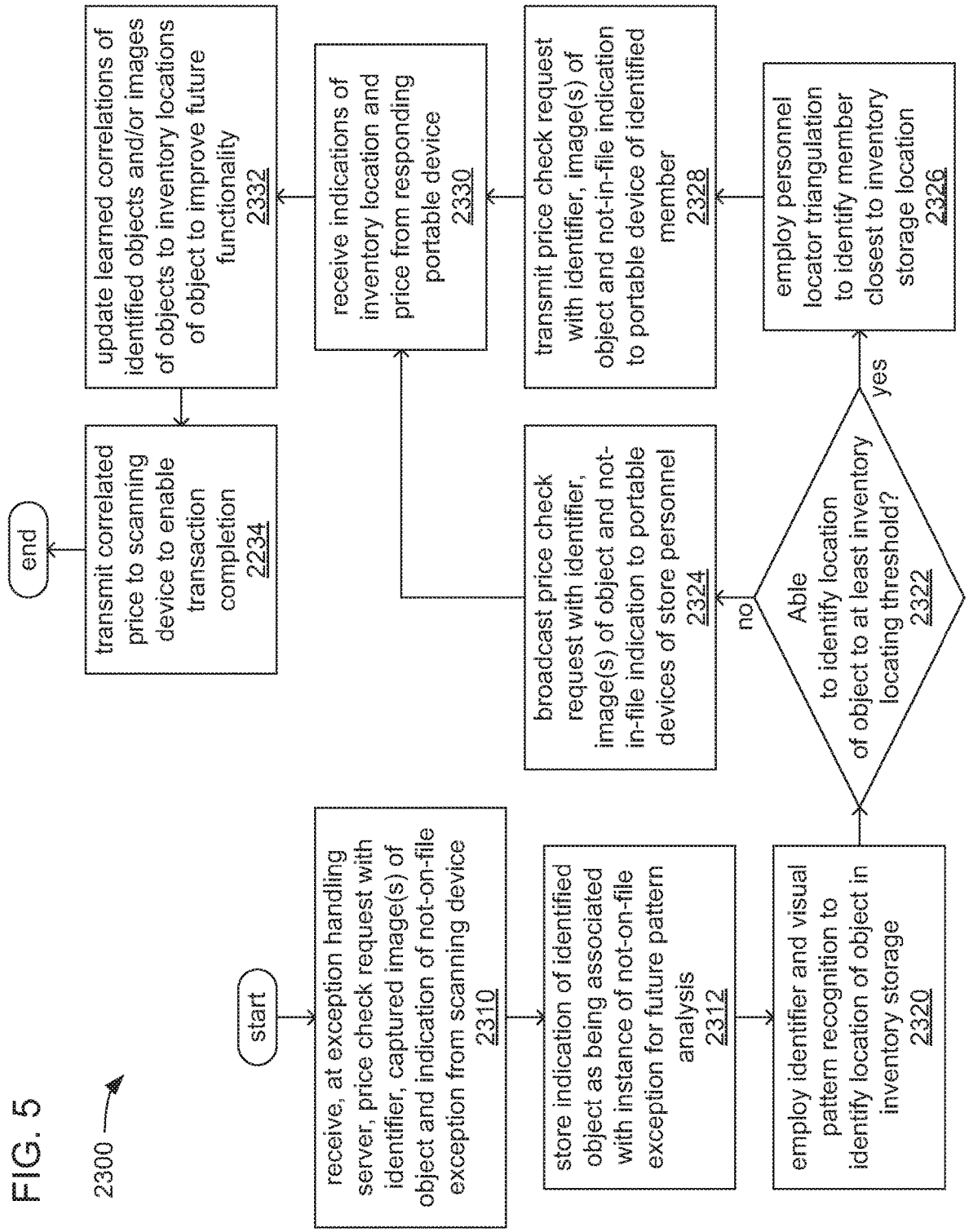

ASSISTED IDENTIFICATION OF AMBIGUOUSLY MARKED OBJECTS

BACKGROUND

1. Technical Field

The present disclosure relates to systems for assisting in the identification of objects with missing or unreadable identification markings, or for which other identifying information in a database is unavailable.

2. Description of the Related Art

The use of encoded data markings applied to surfaces of objects that encode data that identifies those objects for subsequent capture and decoding, such as a barcode that encodes a universal product code (UPC) of a product, is well known. Also well known is the use of such indicia by checkout systems that include scanning devices to capture and decode such indicia, and a store database server that correlates data decoded from such indicia to current sales prices.

A typical store at which various objects, such as products retrieved from shelves within the store, are sold to customers (e.g., a so-called "brick and mortar" store) typically includes one or more "checkout stations" at which the transactions to sell those objects are performed. It has become commonplace for such checkout stations to include a scanning device that is operated by store personnel (e.g., so-called "assisted checkout") and/or by store customers (e.g., so-called "self checkout") to optically scan, and then decode, indicia carried on external surfaces of those various objects that encodes a UPC or other type of data that includes at least an identifier of the object. The decoded identifier of the object is then typically transmitted by the scanning device to a separately located store database server that maintains a store database that correlates identities of objects to current their current sales prices. The store database server typically correlates the decoded identifier to the corresponding price, and transmits the price back to the scanning device for the scanning device to visually present on a display thereof, and to use in completing the transaction to sell that object.

However, there are various ways in which such a sales transaction can go wrong at a checkout station, and cause delays in completing the sales transaction at the checkout station. Events that cause a sales transaction at a checkout station to deviate from simply scanning objects, visually presenting prices, and completing a transaction to sell those objects are commonly referred to as "exceptions." As the successful operation of such a store greatly depends on giving each customer a positive experience so as to encourage customers to return thereto, it is deemed highly desirable to prevent any occurrence of an exception at a checkout station.

Among the exceptions that may occur is the "no-read" exception in which the indicia has in some way been rendered incapable of being scanned. This exception may occur where dirt, stains, other labeling, etc. has obscured the indicia such that it is partly or completely covered. This exception may also occur where the indicia has been misprinted such that it has been printed too lightly or too heavily, and/or has been double-printed such that multiple printings of the same indicia are overlapping each other. This exception may further occur where part or all of the indicia has been lost or destroyed, such as where part or all of the indicia has been scratched out or worn away, or such as where part or all of a label or portion of product packaging that carries the indicia having been torn away.

Frequently, a "no-read" exception can be addressed at the checkout station by personnel or a customer reading text located adjacent to the indicia that provides the same identifier of the object as is encoded within the indicia, and manually entering that text into a manual input device of the scanning device, such as a keyboard or numeric keypad. However, there may be situations in which the same situation that prevents successful scanning of the indicia also prevents successful reading of the text. By way of example the same stain that occludes the indicia may also include the text, or it may be that at least part of the text has been lost along with at least part of the indicia as a result of at least part of a label that carries both having been torn away from an object.

Also among the exceptions that may occur is the "not-in-file" exception in which the identifier of the object is able to be successfully retrieved, but the store database server is unable to correlate the identifier to a price. This exception may occur where human error has resulted in the identifier having been mistyped while being entered into the store database such that the correct identifier is not recognized, or where the identifier having not been entered, at all, despite the object being offered for sale.

Frequently, no-read and not-in-file exceptions are handled by a member of store personnel coming to the location of the checkout station at which the exception has occurred, learning the details of what has happened first hand, and then proceeding to another part of the store where more of the same object is kept on a shelf (or other form of customer-accessible storage) in a procedure commonly referred to as a "price check." Once there, and depending on the nature of the exception, that member of store personnel may then retrieve another of the same object, manually write down the text located near the indicia on the surface of another of the same object, or manually write down the price indicated by the shelf tag for the object. That member of the store personnel then returns to the location of the checkout station either to assist in scanning the other one of the same object retrieved from the shelf or to manually enter the handwritten identifier or price.

Unfortunately, the performance of a price check can be quite time consuming, as it depends on that member of store personnel being able to quickly reach the shelf at which the object is kept, and then quickly return, which necessarily relies on that particular member of store personnel knowing where that particular shelf is located. If that particular member of store personnel must search among multiple shelves or ask other store personnel about the location of the particular shelf, then the price check may consume a considerable amount of time. There is also the possibility that the entire purpose of performing the price check may be wasted if that member of store personnel makes a mistake in either writing down or manually entering the identifier of the object or its price. In response to the amount of time that may be taken up by having store personnel performing price checks, some stores enact a policy of refraining from doing so, and instead, asking the customer what they believe the price to be, which can put the customer in an awkward position if they are unable to remember the price precisely.

Ultimately, either the time wasted by the performance of price checks and the awkward situations for customers that may be created by asking the customer to try to recall the price of an object can create a sufficiently negative experience for a customer that they are discouraged from returning to a store. Thus, the inventor has recognized that a system to more efficiently resolve such exceptions is needed.

SUMMARY

Technologies are described for more efficiently identifying an object where identifying markings normally carried on a surface thereof is missing or has been rendered unreadable, or where the identifying markings cannot be correlated to further identifying information concerning the object in a database.

A scanning device includes at least one image sensor configured to capture at least one image of a first object, wherein: the at least one image comprises a first indicia image of a first indicia carried on a surface of the first object, and a first object image of a different portion of the first object; and the first indicia encodes an identifier of the first object. The scanning device also includes a storage device configured to store the at least one image. The scanning device further includes a processor coupled to the at least one image sensor and the storage device, the processor configured to: interpret the first indicia as captured in the first indicia image to decode the identifier of the first object from the first indicia; in response to a successful decode of the first indicia, transmit the identifier to a store database server, via a network, in a request for the store database server to correlate the identifier to a price at which the first object is to be sold and to respond to the scanning device with the price; in response to an occurrence of an exception comprising a failure to obtain the price based on the first indicia, transmit the at least one image to an exception handling server, via the network, in a first price check request for the exception handling server to respond to the scanning device with the price; receive the price via the network; and visually present the price to enable completion of a checkout procedure to sell the first object.

A checkout system includes a scanning device configured to: capture at least one image of a first object, wherein the at least one image comprises a first indicia image of a first indicia carried on a surface of the first object, and the first indicia encodes an identifier of the first object; interpret the first indicia as captured in the first indicia image to decode the identifier of the first object from the first indicia; in response to an occurrence of an exception comprising a failure to obtain the price based on the first indicia, transmit the at least one image to an exception handling server in a first price check request for the exception handling server to respond to the scanning device with the price; and visually present the price to enable completion of a checkout procedure to sell the first object. The checkout system also includes the exception handling server, wherein the exception handling server is configured to: use visual image recognition with the at least one image to identify an inventory storage location in an inventory storage at which the first object was stored; in response to a successful identification of the inventory storage location, transmit the at least one image and an indication of the identified inventory storage location to a portable device of multiple portable devices that is selected based, at least in part, on its proximity to identified inventory storage location in a second price check request for the identified portable device to respond to the exception handling server with the price; and transmit the price to the scanning device in response to the first price check request following receipt of the price.

A method of operating a checkout system with exception handling includes: capturing, with a scanning device, at least one image of an object having at least one indicia; and retrieving an associated price from a store database server and entering the associated price in a transaction record responsive to a successful decoding of the at least one indicia by the scanning device. The method also includes resolving an exception comprising a failure to obtain the associated price based on the first indicia by: transmitting a price check request, via a network, to at least one portable device selected from among a plurality of portable devices located within a structure housing an inventory based on predetermined criteria for locating an inventory storage location of the object within the structure, the price check request including the at least one image or a new image of the object; and entering a resolved price corresponding to the object into the transaction record responsive to receiving a response to the price check request from the at least one portable device via the network.

BRIEF DESCRIPTION OF THE DRAWINGS

FIGS. 1A and 1B, together, show aspects of example implementations of a checkout system.

FIGS. 2A, 2B, 2C and 2D, together, show aspects of interactions among devices of the checkout system of FIG. 1 to resolve various exceptions.

FIG. 5 shows aspects of the operation of an exception handling server of the checkout system of FIG. 1 to resolve a "not-in-file" exception.

DETAILED DESCRIPTION

Figure 1A:
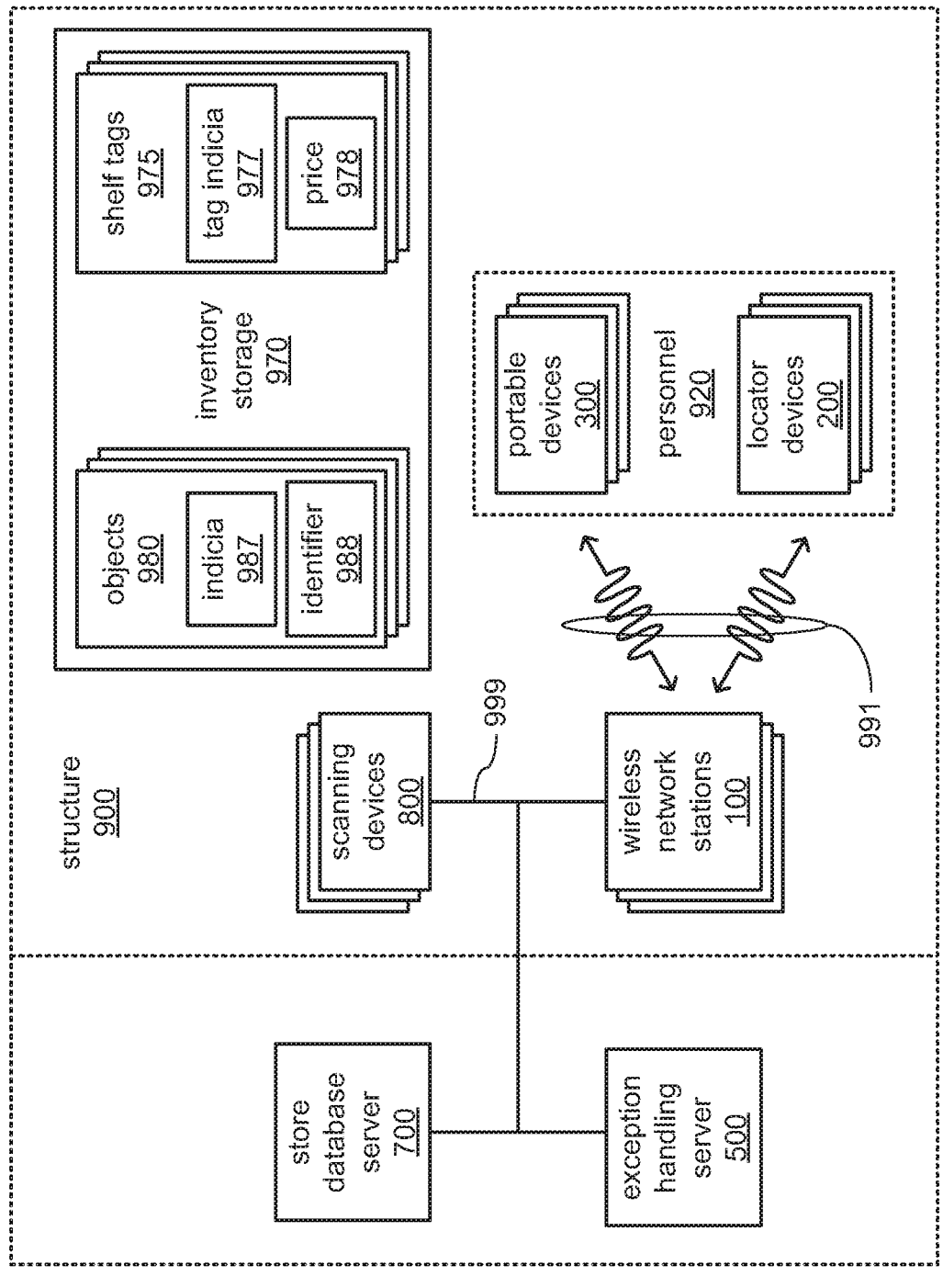

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein is a checkout system configured to assist in more speedily identifying an object with missing or unreadable identification markings and/or for which the identification markings cannot be correlated to other identifying information. Embodiments of the disclosure, as described more fully below, may improve the exception handling processes of the checkout system by providing a faster, more efficient, and/or more accurate checkout process for a current transaction as well as an improved system for future checkout processes. In addition, new features described below may also be added to scanning devices, point of sale systems, exception handling servers, portable devices, and other devices of the checkout system to improve the operability of such devices, themselves, as well as the overall functionality of the checkout system in comparison to conventional methods.

A scanning device includes at least one image sensor configured to capture at least one image of a first object, wherein: the at least one image comprises a first indicia image of a first indicia carried on a surface of the first object, and a first object image of a different portion of the first object; and the first indicia encodes an identifier of the first object. The scanning device also includes a storage device configured to store the at least one image. The scanning device further includes a processor coupled to the at least one image sensor and the storage device, the processor configured to: interpret the first indicia as captured in the first indicia image to decode the identifier of the first object from the first indicia; in response to a successful decode of the first indicia, transmit the identifier to a store database server, via a network, in a request for the store database server to correlate the identifier to a price at which the first object is to be sold and to respond to the scanning device with the price; in response to an occurrence of an exception comprising a failure to obtain the price based on the first indicia, transmit the at least one image to an exception handling server, via the network, in a first price check request for the exception handling server to respond to the scanning device with the price; receive the price via the network; and visually present the price to enable completion of a checkout procedure to sell the first object.

A checkout system includes a scanning device configured to: capture at least one image of a first object, wherein the at least one image comprises a first indicia image of a first indicia carried on a surface of the first object, and the first indicia encodes an identifier of the first object; interpret the first indicia as captured in the first indicia image to decode the identifier of the first object from the first indicia; in response to an occurrence of an exception comprising a failure to obtain the price based on the first indicia, transmit the at least one image to an exception handling server in a first price check request for the exception handling server to respond to the scanning device with the price; and visually present the price to enable completion of a checkout procedure to sell the first object. The checkout system also includes the exception handling server, wherein the exception handling server is configured to: use visual image recognition with the at least one image to identify an inventory storage location in an inventory storage at which the first object was stored; in response to a successful identification of the inventory storage location, transmit the at least one image and an indication of the identified inventory storage location to a portable device of multiple portable devices that is selected based, at least in part, on its proximity to identified inventory storage location in a second price check request for the identified portable device to respond to the exception handling server with the price; and transmit the price to the scanning device in response to the first price check request following receipt of the price.

A method of operating a checkout system with exception handling includes: capturing, with a scanning device, at least one image of an object having at least one indicia; and retrieving an associated price from a store database server and entering the associated price in a transaction record responsive to a successful decoding of the at least one indicia by the scanning device. The method also includes resolving an exception comprising a failure to obtain the associated price based on the first indicia by: transmitting a price check request, via a network, to at least one portable device selected from among a plurality of portable devices located within a structure housing an inventory based on predetermined criteria for locating an inventory storage location of the object within the structure, the price check request including the at least one image or a new image of the object; and entering a resolved price corresponding to the object into the transaction record responsive to receiving a response to the price check request from the at least one portable device via the network.

FIGS. 1A and 1B, together, depict aspects of embodiments of a checkout system 1000 that may include one or more scanning devices 800, a store database server 700, an exception handling server 500, one or more portable devices 300, one or more locator devices 200, and/or one or more wireless network stations 100 coupled by a network 999 that may include a wireless portion 991. As depicted, the devices 100, 200, 300, 500, 700 and/or 800 of the checkout system 1000 may be present and/or permanently installed within a structure 900, such as at least a portion of a commercial building that is operated as a store in which various objects 980 are stored within an inventory storage 970 (e.g., shelving, drawers, pegboard, clothing racks, etc.) for sale to customers of the store.

Various portions of the inventory storage 970 (e.g., individual sections of shelving, drawers, pegboard, clothing racks, etc.) may positioned through the interior of the structure 900 as part of storing a wide variety of objects 980 in a manner in which a customer may at least be able to see them, if not also directly take them from the inventory storage 970 and to the scanning device(s) 800. Distributed throughout the inventory storage 970 may be shelf tags 975 that each mark a location in the inventory storage 970 at which a particular object 980 is to be stored, and that each indicate the price 978 of that particular object 980 in human readable form and/or as encoded into a tag indicia 977 (e.g., a barcode).

Each member 920 of the store personnel may carry with them one of the locator devices 200 and/or one of the portable device 300. Multiple ones of the wireless network stations 100 may be installed throughout the interior of the structure 900 in a manner that enables the location of each member 920 of the store personnel who carries one of the locator devices 200 to be recurringly determined. Each of the locator devices 200 may exchange signals with multiple ones of the wireless network stations 100 to thereby enable the relative strength, the relative timing and/or the detected direction of each of those signals to be used (e.g., any of a variety of triangulation schemes) to recurringly detect the current location of each locator device 200, and thereby recurringly determine the current location of each member 920 who carries one of the locator devices 200.

Each of the objects 980 may carry an indicia 987 on an external surface thereof that is able to be scanned and decoded by the scanning device(s) 800 to retrieve an identifier 988 of the object 980 that is encoded therein. At least one scanning device 800 may located at or near an entrance to a portion of the structure 900 so as to be conveniently located for use in supporting the performance of a checkout procedure by which a customer may purchase one or more objects 980.

Each of the exception handling server 500 and the store database server 700 may be located within the structure 900 or remotely from the structure 900. Thus, in at least some embodiments, the network 999 by which one or both of the exception handling server 500 and the store database server 700 may communicate with others of the devices 100, 200, 300 and/or 900 may extend through a portion of the Internet. It should be noted that, although the network 999 is described and depicted herein as having only a portion 991 thereof implemented as a wireless network, other embodiments are possible in which the majority or all of the network 999 within the structure is implemented as a wireless network.

The checkout procedure for the sale of an object 980 may normally entail the use of the scanning device 800 to scan the indicia 987 carried on a surface of that object 980. The scanned indicia 987 may then be decoded to retrieve the identifier 988 of the object therefrom, and the identifier 988 may be transmitted via the network 999 to the store database server 700 where the identifier 988 is correlated to a price 978. The store database server 700 may then transmit an indication of the correlated price 978 to back to the scanning device 800 to enable completion of the checkout procedure for the sale of that object 980. However, as has been described, the checkout procedure may be caused to deviate from the normal way in which it progresses by the occurrence of any of a variety of types of exception, including the earlier described no-read and not-in-file exceptions.

Where a no-read exception occurs, it may be that the indicia 987 carried on the surface of an object 980 is unable to be successfully scanned. It may also be that the a human readable form of the identifier 988 of the object may be adjacent to the indicia 987 on a surface of the object 980, but is unable to be read. As will be described in greater detail, in response to such a no-read exception, the scanning device 800 may capture one or more images of the object 980, and may relay the one or more images, along with an indication of the no-read exception having occurred, to the exception handling server 500. The exception handling server 500 may attempt the use of visual pattern recognition with the one or more images captured by the scanning device 800 to attempt to directly identify the object 980. If the exception handling server 500 is able to so identify the object 980 with a relatively high degree of certainty (e.g., based on a determined match probability being above a predetermined threshold), then the exception handling server 500 may relay an indication of the identity of the object 980 to the store base server 700 to obtain the current price 978 therefrom.

However, if the exception handling server 500 is not able to identify the object 980 with such a relatively high degree of certainty (or at all), then the exception handling server 500 may attempt to use visual pattern recognition to at least correlate the object 980 to a particular portion of the storage inventory 970 within a particular portion of the structure 900. The particular portion of the storage inventory 970 that is identified by the exception handling server 500 may be categorized in a variety of different ways and/or to a variety of different degrees of specificity according to embodiments of the disclosure. For example, the exception handling server 500 may return a specific aisle, a portion of an aisle, a range of aisles, a display area, a seasonal region, a special region (e.g., bakery, deli, cold foods, dairy, produce, etc.), or any other sub-location or category as desired by the store management.

If the exception handling server 500 is able to so correlate the object 980 to a particular location, then the exception handling server 500 may employ the multiple wireless networking stations 100, through the network 999, to locate a member 920 of the store personnel who is closest to that particular location. Responsive to identifying that particular member 920, the exception handling server 500 may transmit, via at least the wireless portion 991 of the network 999, a request to the portable device 300 carried by that particular member 920 to go to that particular location to obtain information needed to identify the object 980 and/or to obtain its price 978 from its corresponding shelf tag 975. In so doing, the exception handling server 500 may relay the one or more images captured by the scanning device 800 to the portable device 300, along with an indication of the no-read exception having occurred. In some embodiments, multiple members 920 of the store personnel may be identified as being located within a predetermined acceptable proximity of that particular location within the structure 900 according to settings of the system 1000. As such, some embodiments may include the exception handling server transmitting the request to multiple portable devices 300 carried by those identified members 920, any of which may accept the request and perform the tasks described above. Doing so may increase the likelihood of the request being handled in a timely manner in the event that one of the members 920 does not handle the request (e.g., due to ignoring the request, not immediately seeing the request, being occupied with a different customer, etc.). In some embodiments, the exception handling server 500 may first send the request to the closest identified member 920 of the store personnel for acceptance, and then send to other closely identified members 920 in a sequential manner in order of proximity and/or availability in the event that the identified member 920 rejects the request or does not respond within a predetermined period of time.

However, if the exception handling server 500 is not able to correlate the object 980 to a particular location, then the exception handling server 500 may transmit a request, to multiple ones of the portable devices 300 carried by members 920 of the store personnel at multiple locations within the structure 900 to provide the information needed to identify the object 980 and/or to obtain its price 978 from its corresponding shelf tag 975. In so doing, the exception handling server 500 may relay the one or more images captured by the scanning device 800 to all of the portable devices 300 that are contacted with request, along with an indication of the no-read exception having occurred. A member 920 of the store personnel may operate their portable device 300 to indicate that they are accepting the request.

Regardless of whether the request with the one or more images and an indication of the type of exception is transmitted to a single portable device 300 of a member 920 determined to be closest to a particular location, or the request is transmitted more broadly to multiple members 920 to enable one of them to volunteer to handle the request, the fact that the one or more images captured by the scanner 800 and an indication of the type of exception is transmitted along with the request obviates the need for any of the store personnel to make the journey to the scanning device 800 to learn the details of the exception. In this way, the work of identifying an object and/or its current price 978 is performed more quickly.

After arriving at the location within the inventory storage 970 from which the object 980 at the scanning device 800 was obtained, that particular member 920 may be guided by their portable device 300 to use the portable device 300 to scan and decode the indicia 987 carried by another of the same object 980 to obtain the identifier 988 of the object 980 therefrom. The portable device 300 may then transmit the identifier 988 to the exception handling server 500, via at least the wireless portion 991 of the network 999, which may relay the identifier 988 to the store database server 700 to be correlated to a price 978, which may then be relayed to the scanning device 800. Alternatively, that particular member 920 may be guided by their portable device 300 to scan and decode a tag indicia 977 that may be carried on the shelf tag 975 that corresponds to the object 980, where the tag indicia 977 may encode an indication of the price 978.

Regardless of whether the portable device 300 is used to scan and decode an indicia 987 of another of the same object 980 or is used to scan and decode a tag indicia 977 of a shelf tag 975, the fact that the price 978 of the object 980 is ultimately transmitted back to the scanning device 800 allows the checkout procedure for the sale of the item to be completed without requiring store personnel to personally convey such information back to the scanning device 800. In this way, further time is saved that would have been consumed with such a journey back to the location of the scanning device 8000.

Where a not-in-file exception occurs, it may be that the indicia 987 carried on the surface of an object 980 was able to be successfully scanned, or at least the text adjacent to the indicia 987 that provides the identifier 988 of the object 980 was able to be successfully entered into the scanning device 980 using an input device, such as a keyboard or touch screen interface. However, it may be that, after receiving the identifier 988 from the scanning device 980 via the network 999, the store database server 700 is unable to correlate the identifier 988 to any other information about the object 980, including its current price 978. It may be that such information about the object 980 is present within the store database maintained by the store database server 700, but that it may be associated with an incorrect identifier as a result of human error. Alternatively, it may be that human error has lead to the object 980 being made available on the inventory storage 970 for being selected by a customer for purchase before any such information about the object 980 has yet been added to the store database.

In response to receiving an indication of the not-in-file exception via the network 999 from the store database server 700, the scanning device 800 may capture one or more images of the object 980, and may relay the one or more images, along with an indication of the not-in-file exception having occurred, to the exception handling server 500. The exception handling server 500 may attempt the use a combination of the identifier 988 of the object 980 and visual pattern recognition with the one or more images captured by the scanning device 800 to correlate the object 980 to a particular portion of the storage inventory 970 within a particular portion of the structure 900. If the exception handling server 500 is able to so correlate the object 980 to a particular location, then the exception handling server 500 may employ the multiple wireless networking stations 100, through the network 999, to locate a member 920 of the store personnel who is closest to that particular location (or multiple members of the store personnel who are within a predetermined acceptable proximity of the particular location as described above). Responsive to identifying that particular member 920, the exception handling server 500 may transmit, via at least the wireless portion 991 of the network 999, a request to the portable device 300 carried by that member 920 to go to that particular location to obtain the price 978 of the object 980 from its corresponding shelf tag 975. In so doing, the exception handling server 500 may relay the one or more images captured by the scanning device 800 to the portable device 300, along with an indication of the not-in-file exception having occurred.

However, if the exception handling server 500 is not able to correlate the object 980 to a particular location, then the exception handling server 500 may transmit, via at least the wireless portion 991 of the network 999, a request, to multiple ones of the portable devices 300 carried by members 920 of the store personnel at multiple locations within the structure 900 to obtain the price 978 of the object 980 from its corresponding shelf tag 975. In so doing, the exception handling server 500 may relay the one or more images captured by the scanning device 800 to all of the portable devices 300 that are contacted with request, along with an indication of the not-in-file exception having occurred. A member 920 of the store personnel may operate their portable device 300 to indicate that they are accepting the request.

Again, the fact that the one or more images captured by the scanner 800 and an indication of the type of exception is transmitted along with the request obviates the need for any of the store personnel to make the journey to the scanning device 800 to learn the details of the exception. In this way, the work of identifying an object and/or its current price 978 is performed more quickly. After arriving at the location within the inventory storage 970 from which the object 980 at the scanning device 800 was obtained, that particular member 920 may be guided by their portable device 300 to scan and decode a tag indicia 977 that may be carried on the shelf tag 975 that corresponds to the object 980, where the tag indicia 977 may encode an indication of the price 978. The portable device 300 may then transmit the price 978 to the exception handling server 500, via at least the wireless portion 991 of the network 999, which may relay it to the scanning device 800 to use in completing the checkout procedure for the sale of the object 980. Again, the fact that the price 978 of the object 980 is ultimately transmitted back to the scanning device 800 allows the checkout procedure for the sale of the item to be completed without requiring store personnel to personally convey such information back to the scanning device 800.

Figure 2A:
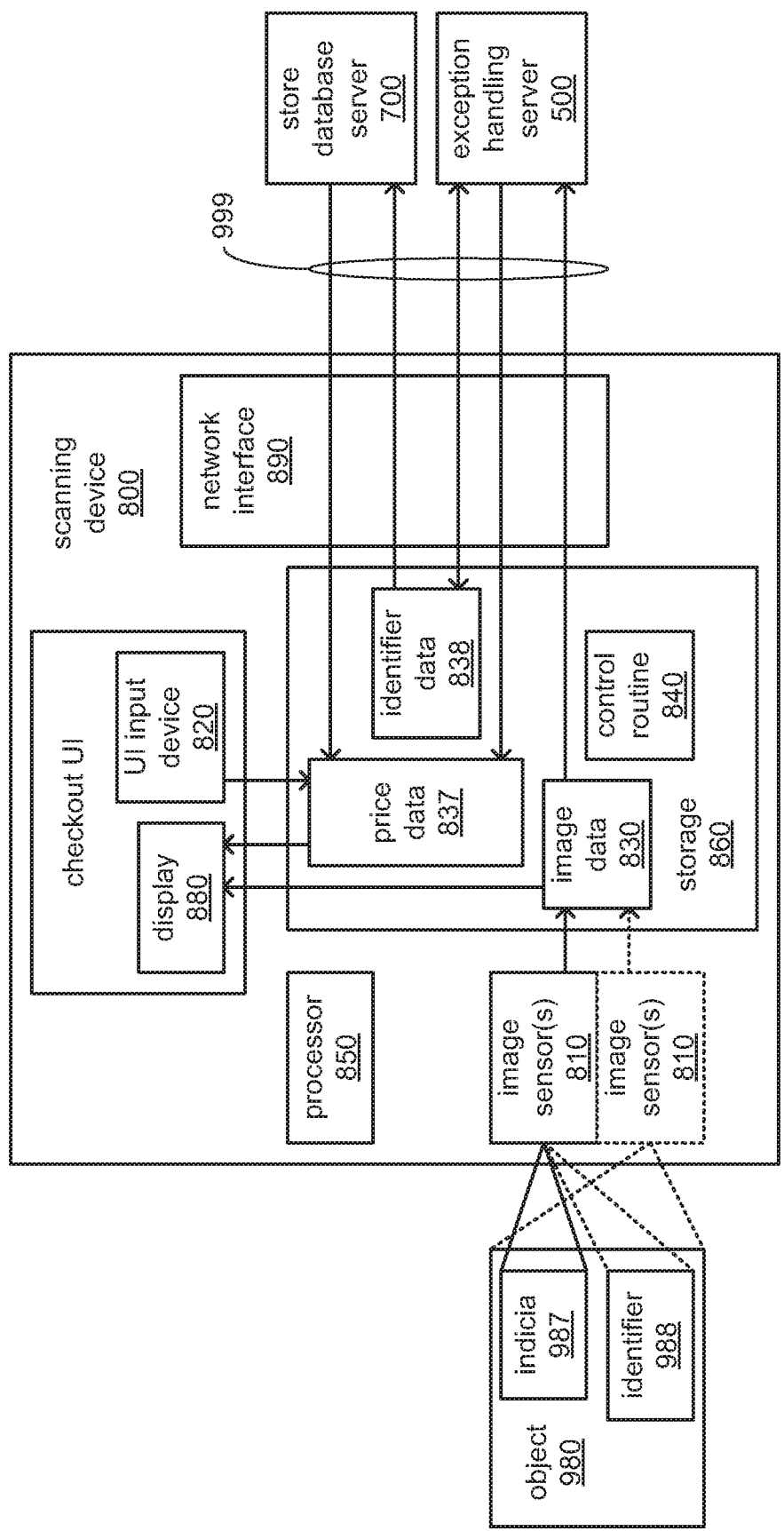
Figure 2B:
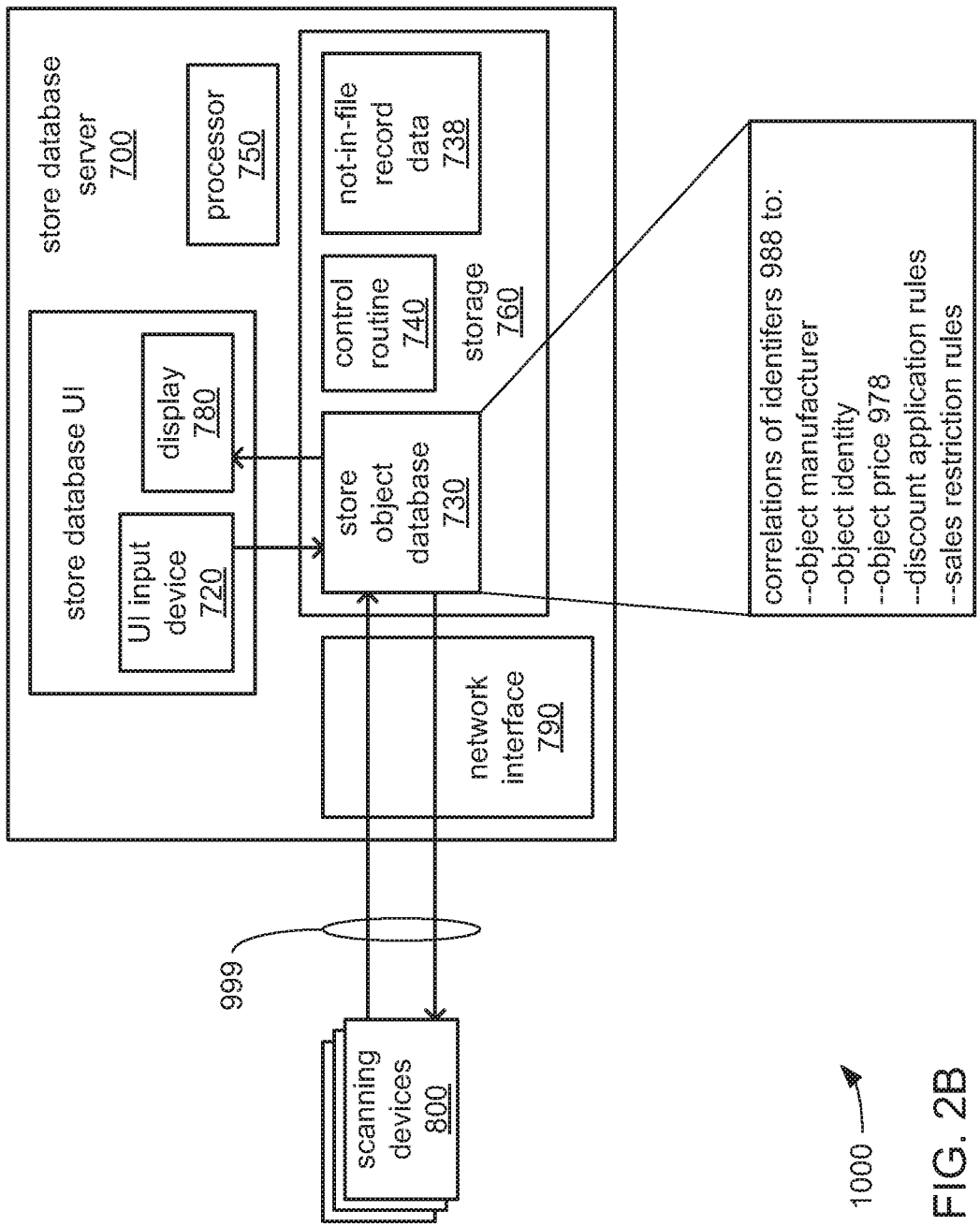

FIGS. 2A, 2B, 2C and 2D, together, depict various aspects of the operation of each of the devices 800, 700 and 500. FIGS. 2A, 2B and 2C, together, also depict various aspects of the manner in which these devices may interact to resolve various exceptions.

Turning to FIG. 2A, each scanning device 800 may include one or more image sensors 810, a user interface (UI) input device 820, a display 880, a processor 850, a storage 860, and/or a network interface 890 to couple each scanning device 800 to the network 999. Within each scanning device 800, the image sensors 810, the UI input device 820, the display 880, the storage 860 and the network interface 890 may each be communicatively coupled to the processor 850 to exchange data therewith through the exchange of electrical, optical, magnetic and/or other signals through one or more buses and/or other form of interconnect. The storage 860 may store image data 830, identifier data 838, price data 837 and/or a control routine 840. The control routine 840 may incorporate a sequence of instructions operative on the processor 850 to implement logic to perform various functions.

In executing instructions of the control routine 840, the processor 850 may be caused to operate the UI input device 820 and the display 880 to provide a checkout UI by which an operator of one of the scanning devices 800 may be guided through a performance of a checkout procedure by which an object 980 retrieved from a particular location within the inventory storage 970 is sold. In so doing, the processor 850 may be caused to operate the display 880 to visually present the price 978 of the object 980, and/or may monitor the UI input device 820 for entry of input indicating approval by the customer to proceed with the checkout procedure to sell the object 980 at the visually presented price 978.

More specifically, in executing instructions of the control routine 840, the processor 850 may be caused to operate the one or more image sensors 810 to capture at least an image of the indicia 987 carried on a surface of the object 980. In some embodiments, the processor 850 may also be caused to simultaneously operate the one or more image sensors 810 to capture one or more other images of the object 980, including an image of the identifier 988 also carried on the surface of the object 980 in printed form at a location thereon that may be adjacent to the indicia 987, and/or one or more wider images that each may include a relatively large proportion of the exterior of the object 980. The processor 850 may be caused to store each of such captured images within the storage 860 as part of the image data 830.

In some embodiments, the identifier 988 may be an identifier of the object 980 that also includes an indication of the identity of the manufacturer of the object 980. More specifically, and in some of such embodiments, the identifier 988 may be a Universal Product Code (UPC) based on one or more of the UPC barcode standards promulgated by GS1 US of Dayton, Ohio, USA. Also, in such embodiments, the indicia 987 may be a one-dimensional barcode that is also based on one or more of the UPC barcode standards promulgated by GS1 US such that the indicia 987 encodes the identifier 988. However, it should be noted that other identifiers and symbologies are also contemplated, including, for example, two-dimensional barcodes, watermarks, etc.

It should be noted that the scanning device 800 may incorporate multiple ones of the image sensor 810 to capture images of the object from different angles and/or with fields of view (FOV) that differ by their angle of view (e.g., narrower vs. wider FOVs). More specifically, one or more of the image sensors 810 may be more specialized in the angle of view of their FOV and/or type of lighting used to capture the indicia 987 and/or the identifier 988. Alternatively or additionally, one or more of the image sensors 810 may be more specialized in having an FOV with a wider angle of view to capture a wider image of the object 980 that may be more amenable to being viewed by a person to visually recognize the object 980 based on personal knowledge thereof.

Following the capture of at least an image of the indicia 987, the processor 850 may be caused to interpret the indicia 987 to decode the identifier 988, which the processor 850 may store as the identifier data 838. The processor 850 may then be caused to operate the network interface 890 to transmit the identifier 988 to the store database server 700 via the network 999 to have the identifier 988 correlated by the store database server 700 to the price 978 of the object. Responsive to receiving the price 978 from the store database server 700 via the network 999, which the processor 850 may store as the price data 837, the processor 850 may be caused to operate the display 880 to display the price 978 as part of completing the checkout procedure for the sale of the object 980.

Such scanning of the indicia 987, decoding of the identifier 988, transmission of the identifier 988 to the store database server 700, and receipt of the price 978 therefrom may represent the normal progression of a checkout procedure. However, as previously discussed, various exceptions may occur that may alter the course of performance of the checkout procedure from normal, including "no-read" exceptions and "not-in-file" exceptions.

Where a no-read exception occurs, it may be that the indicia 987 carried on the surface of an object 980 is, at least, unable to be successfully scanned. Again, the indicia 987 may be obscured, may have been damaged, may not have been printed correctly, etc. In response to one or more unsuccessful attempts to scan the indicia 987, the processor 850 may be caused by continued execution of the control routine 840 to operate one or more of the image sensors 810 to capture an image of the identifier 988 as carried in printed form on a surface of the object 980, perhaps adjacent to the indicia 987, if such an image has not already been captured (e.g., simultaneously with the capture of an image of the indicia 987). The processor 850 may then be caused to employ any of a variety of forms of visual recognition algorithm to interpret the characters and/or other symbols of the identifier 988 to thereby decode the identifier therefrom, which the processor 850 may store as the identifier data 838. By way of example, where the identifier 988 is printed on a surface of the object 980 using alphanumeric characters, then any of a variety of optical character recognition (OCR) algorithms may be employed by the processor 850 to interpret those characters to decode the identifier 988. In embodiments in which the indicia 987 conforms to one or more of the UPC standards, the identifier 988 may be printed on a surface of the object 980 at a location relative to the indicia 987 and in a font that are both selected to comply with one or more of the UPC standards, such that a simplified form of OCR that is based on the use of such a font may be used by the processor 850. If the decoding of the identifier 988 is successful, then the processor 850 may be caused to transmit the identifier 988 as so decoded to the store database server 700 to be correlated to the price 978 just as the processor 850 would have done with the identifier 988 as decoded from the indicia 987, and the checkout procedure may, from then on, proceed normally. Still, in some embodiments, the processor 850 may be caused to transmit the identifier 988 to the exception handling server 500 along with an indication of difficulty having been encountered in scanning the indicia 987 that encodes the identifier 988 on the object 980. As will be explained in greater detail, the exception handling server 500 may store indications of such occurrences for later statistical analysis to identify patterns of instances of such difficulties as a mechanism to alert store personnel to a recurring problem that may be repeatedly preventing the checkout procedure from proceeding smoothly.

However, it may be that the identifier 988, as provided on a surface of the object 980, is also not able to be decoded. Again, just like the indicia 987, the identifier 988, as provided on a surface of the object 980, may also be obscured, may also have been damaged, may also have not been printed correctly, etc. In response to one or more unsuccessful attempts to scan the identifier 988, the processor 850 may be caused by continued execution of the control routine 840 to operate the display 880 to prompt the operator of the scanning device 800 (e.g., a member 920 of store personnel or a customer performing "self-checkout") to attempt to read the identifier 988 on a surface of the object 980, themselves, and to manually enter the identifier 988 into the scanning device 800 via the UI input device 820. If the operator is able to enter the identifier 988, which the processor may store as the identifier data 838, then the processor 850 may be caused to transmit the identifier 988 as manually entered to the store database server 700 to be correlated to the price 978 just as the processor 850 would have done with the identifier 988 as decoded from the indicia 987, and the checkout procedure may, from then on, proceed normally. Still, in some embodiments, the processor 850 may be caused to transmit the identifier 988 to the exception handling server 500 along with an indication of difficulty having been encountered in both scanning the indicia 987 that encodes the identifier 988, and in using visual image recognition to interpret the identifier 988 as printed on an object 980. Again, the exception handling server 500 may store indications of such occurrences for later statistical analysis.

However, if the processor 850 receives an indication through the UI input device 850 that the operator is unable to provide the identifier 988 (e.g., the operator presses a button of the UI input device indicating such an inability to provide the identifier 988), then the processor 850 may be caused to operate one or more of the image sensors 810 to capture one or more wider view images of the object 980, if such one or more images have not already been captured (e.g., simultaneously with the capture of an image of the indicia 987). The processor 850 may then be caused to operate the network interface 890 to transmit, to the exception handling server 500 via the network 999, a price check request that includes an indication of a no-read exception as having occurred, along with one or more of the captured images of the object 980. As will be explained in greater detail, the exception handling server 500 may use the one or more images to attempt to itself identify the object 980 and/or may use the one or more images in guiding one or more members 920 of store personnel through providing the price 978, which the exception handling server 500 may then relay to the scanning device 800 to enable completion of the checkout procedure for the sale of the object 980. The one or more captured images of the object 980 transmitted with the price check request may include the same image(s) used by the scanning device 800 to attempt to decode the indicia 987 carried by the object 980. In some embodiments, one or more different images may be transmitted that were not used in the decoding of the indicia 987 carried by the object 980. For example, the scanning device 800 may prompt the user to position the object 980 to obtain a clear image of the object 980 or the packaging thereof to assist the exception handling server 500 in its attempt at resolving the no-read exception, itself, or in assisting members 920 of the store personnel to respond to the price check request.

Where a not-in-file exception occurs, it may be that the indicia 987 carried on the surface of the object 980 was successfully scanned, or that the identifier 988 as printed on a surface of the object 980 was successfully interpreted by visual image recognition, or that the operator of the scanning device 800 was able to successfully manually provide the identifier 988 via the UI input device 820. However, upon transmitting the identifier 988 to the store database server 700 via the network 999, the processor 850 may have then received an indication from the store database server 700 via the network 999 that the identifier 988 could not be correlated to a price 978. Stated differently, the store database server 700 may transmit an indication of the not-in-file exception to the scanning device 800. Again, it may be that the price 978 of the object 980 is stored within the store database server 700, but may be correlated to a mistyped identifier such that the price 978 cannot be retrieved using the identifier 988 retrieved from the object 980 by the scanning device 800, even though the identifier 988 may be correct.

In response to the receipt of the not-in-file exception indication, the processor 850 may be caused to operate one or more of the image sensors 810 to capture one or more wider view images of the object 980, if such one or more images have not already been captured. The processor 850 may then be caused to operate the network interface 890 to transmit, to the exception handling server 500 via the network 999, a price check request that includes an indication of a not-in-file exception as having occurred, along with the identifier 988 and the one or more of the captured images of the object 980. As will be explained in greater detail, the exception handling server 500 may use the identifier 988 and/or the one or more images in guiding one or more members 920 of store personnel through providing the price 978, which the exception handling server 500 may then relay to the scanning device 800 to enable completion of the checkout procedure for the sale of the object 980. The one or more captured images of the object 980 transmitted with the price check request may include the same image(s) used by the scanning device 800 to attempt to decode the indicia 987 carried by the object 980. In some embodiments, one or more different images may be transmitted that were not used in the decoding of the indicia 987 carried by the object 980. For example, the scanning device 800 may prompt the user to position the object 980 to obtain a clear image of the object or the packaging thereof to assist members 920 of the store personnel to respond to the price check request.

Turning to FIG. 2B, the store database server 700 may include a UI input device 720, a display 780, a processor 750, a storage 760, and/or a network interface 790 to couple the store database server 700 to the network 999. Within the store database server 700, the UI input device 720, the display 780, the storage 760 and the network interface 790 may each be communicatively coupled to the processor 750 to exchange data therewith through the exchange of electrical, optical, magnetic and/or other signals through one or more buses and/or other form of interconnect. The storage 760 may store a store object database 730, not-in-file record data 738, and/or a control routine 740.

The store object database 730 may be set up to be a database of all objects 980 that are to be sold by at least the store within the structure 900. As depicted, the store object database 730 correlates identifiers 988 of numerous objects 980 to various pieces of information about each of those objects 980, including and not limited to, the manufacturer thereof, the identity thereof (e.g., a brief description of what the object 980 is), the price 978 thereof, any rules for the application of discounts to the price thereof, and/or any restrictions on the sale thereof (e.g., limits to particular times of data, minimum age required of a customer, etc.). The control routine 740 may incorporate a sequence of instructions operative on the processor 750 to implement logic to perform various functions.

In executing instructions of the control routine 740, the processor 750 may be caused to operate the UI input device 720 and the display 780 to provide a store database UI by which an operator of the store database server 700 may add entries to and/or alter entries within the store object database 730 for each type of object 980 that is to be sold by at least the store within the structure 900. In so doing, the processor 750 may be caused to operate the display 780 and the UI input device 720 to provide any of a variety of sets of menus, object entry editing views, etc. by which an operator of the store database server 700 may add a new entry for a new object 980 that has been added to the inventory of the store to be sold, and/or edit an existing entry for an object 980 that is already within the inventory of the store to be sold.

Also in executing instructions of the control routine 740, the processor 750 may monitor the network interface 790 for the receipt of requests, received from at least scanning device(s) 800 via the network 999, to correlate an identifier 988 of an object 980 to at least a price 978 at which the object is to be sold. In response, the processor 750 may be caused to use the received identifier 988 to search the store object database 930 for an entry for the corresponding object 980. If the processor 750 is successful in locating such an entry, then the processor 750 may retrieve at least the price 978 for the corresponding object 980, as well as any indications of discounts and/or restrictions that may apply to a sale of the corresponding object 980. The processor 750 may then operate the network interface 790 to transmit such retrieved information back to the requesting device via the network 999.

Unfortunately, and as previously discussed, wherever the ability is provided for persons to enter information, an opportunity is thereby created for the introduction of errors during such entry. Thus, as also previously discussed, it may be that there may be some entries in the store object database 730 that contain errors including errantly entered object identifiers 988 such that those entries may be rendered incapable of being used to correlate an object identifier received in such a request to a price 978. If, in responding to such a request, the processor 750 is unable to locate an entry for an object 980 based on an identifier 988 received for that object 980 in a request via the network 999, then the processor 750 may transmit back to the requesting device an indication of a not-in-file exception, as previously described.

In some embodiments, the processor 750 may be caused to maintain indications of received identifiers 988 that were not able to be correlated within the not-in-file record data 738 for use in identifying and resolving errors that may exist in the store object database 730.

Turning to FIG. 2C, the exception handling server 500 may include a processor 550, a storage 560, and/or a network interface 590 to couple the exception handling server 500 to the network 999. Within the exception handling server 500, the storage 560 and the network interface 590 may each be communicatively coupled to the processor 550 to exchange data therewith through the exchange of electrical, optical, magnetic and/or other signals through one or more buses and/or other form of interconnect. The storage 560 may store a learned correlations data 530, a configuration and rules data 535, an exception record 538 and/or a control routine 540.

The learned correlations data 530 may implement at least a portion of an artificial intelligence (AI) system by which correlations are identified and learned between different pieces of information concerning objects 980, and by which such learned correlations are used to aid in identifying an object 980 and/or its location within the inventory storage 970 based on what may be relatively limited information concerning that object 980. As depicted, among the specific correlations that may be learned may be correlations between captured images and locations within the inventory storage 970, correlations between combinations of captured images and identifiers 988 and locations within the inventory storage 970, and/or correlations between captured images and identifiers 988.

The configurations and rules data 535 may provide various parameters in support of both the learning and use of such correlations. Among such parameters may be locations and/or other characteristics of each wireless network station 100 within the structure 900 and relative to various locations within the inventory storage 970 to enable the use of the wireless network stations 100 in locating store personnel within the structure 900 and relative to the inventory storage 970. In some embodiments, such characteristics of each of the wireless network stations 100 may be correlated to a grid or other form of map of in which the structure 900 is divided into a set of regions that cover all of the locations at which objects 980 may be stored within the structure 900, including at least all locations at which objects 980 may be stored within the inventor storage 970. By way of example where the structure 900 houses a grocery store, there may be separate regions within the structure 900 that are given to each aisle and/or to each section about the periphery of the grocery store for various types of food (e.g., bakery, deli, seafood, meats, cheeses, wine, produce, etc.). By way of another example where the structure 900 houses a clothing store, there may be separate regions within the structure 900 that are given to each aisle and/or to different display areas for various brands of clothing. Also among such parameters may be specifications of one or more thresholds of uncertainty in determining whether one piece of information about an object 980 has been correlated to another such piece of information with sufficient certainty as to proceed with using that correlation.

In executing instructions of the control routine 540, the processor 550 may monitor the network interface 590 for the receipt of a price check request, received via the network 999 from a scanning device 800, for an object 980 where either a no-read or not-in-file exception has occurred.

As previously discussed, where a no-read exception has occurred, the scanning device 800 that has encountered this exception may transmit a price check request via the network 999 to the exception handling server 500, where the price check request may include one or more images of the object 980 captured by the scanning device 800, as well as the indication of the no-read exception as having occurred. In response, the processor 550 may initially employ any of a variety of types of visual image recognition that use the learned correlations of captured images to identifiers 988 of the learned correlation data 530 to attempt to identify the object 980 (i.e., determine the identifier 988 of the object 980). If the processor 550 determines that the identity of the object 980 can be determined to a degree of certainty that meets a relatively high predetermined threshold (e.g., a degree of certainty deemed high enough to rely upon such identification as the basis to determine the price 978), then the processor 550 may operate the network interface 590 to transmit, via the network 999, a request to the store database server for the price 978 for the object 980 based on the identifier 988 to which the processor 550 has correlated the one or more received images. Upon receiving the price 978 from the store database server 700, the processor 550 may operate the network interface 590 to relay the received price 978 back to the requesting scanning device 800 via the network 999.

However, if the processor 550 determines that it is not able to identity of the object 980 with such a level of certainty, then the processor 550 may employ any of a variety of types of visual image recognition that use the learned correlations of captured images to locations within the inventory storage 970 to attempt to identify the location within the storage 970 at which the object 980 was stored and where more of the same object 980 may still be stored, as well as where a shelf tag 975 with the price 978 of the object 980 may be located. If the processor 550 determines that the location for the object 980 within the inventory storage 970 can be determined to a degree of certainty that meets a predetermined threshold of certainty deemed sufficient for effectively narrowing the range of likely locations within the inventory storage 970, then the processor 550 may operate the network interface 590 to cooperate, via the network 999, with the wireless network stations 100 to identify a member 920 of the store personnel who is closest to the identified location (or multiple members who are within a predetermined acceptable proximity to the identified location, as described above).

As previously discussed, each member 920 of the store personnel may carry (e.g., wear) one of the locator devices 200 by which the location of each within the structure 900 may be identified through use of the wireless network stations 100. Again, multiple ones of the wireless network stations 100 may be operated cooperatively, making use of such wireless signal characteristics as strength, timing and/or direction to identify a locator device 200 that is closest to the identified location, and thereby identify a member 920 of the store personnel who is closest to the identified location. Upon identifying that particular member 920, the processor 550 may then operate the network interface 590 to transmit a price check request to the portable device 300 that is also carried by that particular member 920, via the network 999 (including the wireless portion 991 thereof). Included in the price check request may be either descriptive text or a visual indication of the identified location within the inventory storage 970 (e.g., a portion of a map of the structure 900 depicting the identified location), and the one or more images of the object 980 captured by the image sensor(s) 810 of the scanning device 800 from which the original price check request was received, as well as an indication of the no-read exception.

However, if the processor 550 is not able to identify the location for the object 980 within the inventory storage 970 with such a degree of certainty, then the processor 550 may be caused to operate the network interface 590 to cooperate, via the network 999, with the wireless network stations 100 to broadcast a price check request for the price 978 of the object 980 to all of the portable devices 300 carried by all of the members 920 of the store personnel who may be present within the structure 900 at that time through at least the wireless portion 991 of the network 999. Included in the price check request may be the one or more images of the object 980 captured by the image sensor(s) 810 of the scanning device 800 from which the original price check request was received, as well as an indication of the no-read exception. The processor 550 may then monitor the network interface 590 for the receipt of an indication from one of the portable devices 300 that its associated member 920 has accepted the price check request. In some embodiments, the price check request may be transmitted to portable devices 300 of only a subset of members 920 of store personnel based, at least in part, on factors other than strict proximity such as experience level (e.g., years of service, job title, performance rating, etc.), specialized knowledge, known availability, metrics derived responding to prior requests (e.g., accuracy, promptness in responding, speed in resolving prior requests), or any combination thereof including the system weighing such factors when selecting one or more members 920 to send such requests in a first instance before transmitting to subsequent members 920 of store personnel. Thus, the exception handling server 500 may also include (e.g., have access to) and update such information about the members 920 of the store personnel.

Regardless of whether the processor 550 caused the transmission of a price check request to a particular portable device 300 of a particular member 920, or caused the broadcast of a price check request to multiple portable devices 300, the processor 550 may then operate the network interface 590 to await a response from a portable device 300 that conveys at least the price 978. In response to the receipt of such a response, the processor 550 may relay at least the price 978 back to the scanning device 800 from which the original price check request was received.

In some embodiments, the response from the responding portable device 300 that provides the price 978 may also include an image of the shelf tag 975 that carries an indication of the price 978 thereon. This may be of significance since the law in some regions may specify that the price 978 shown on the shelf tag 975 is dispositive of what price should be. Alternatively or additionally, it has become commonplace practice at many stores to treat the price shown on the shelf tag 975 as the dispositive price. Therefore, it may be deemed desirable to provide a customer an image of what is shown on the shelf tag 975. In support of this, each of the portable devices 300 may be capable of capturing an image of the shelf tag 975 and relaying it to the exception handling server 500, where the processor 550 may relay the image of the shelf tag 975, along with the price 978, via the network to the requesting scanning device 800.

In some embodiments, the response from the responding portable device 300 may also include the identifier 988 of the object 980. As will be explained in greater detail, the member 920 of the store personnel who responds to the price check may be guided by their portable device 300 to scan the indicia 987 of another of the object 980 that is still in the inventory storage 970 and/or may be guided to scan the shelf tag 975, which may also carry the indicia 987 in some embodiments. Upon receiving a response from the responding portable device 300 that provides the price 978 and the identifier 988 of the object 980, the processor 550 may be caused to store an indication of various details of the price check that was performed due to a no-read exception and its resolution within the exception record 538. More specifically, the processor 550 may store an indication of the identifier 988, an indication that a no-read exception connected to the object 980 has occurred, and what the price 978 was determined to be. The processor 550 may also store the one or more images of the object 980 captured by the scanning device 800 and/or any image that was captured by the responding portable device 300 of the shelf tag 975.

Alternatively or additionally, the processor 550 may use such information from the resolution of this price check to update one or more of the learned correlations of the learned correlations data 530. By way of example, with the one or more images captured by the scanning device 800 having now been matched to an identifier 988 for the object 980 depicted therein, the processor 550 may be caused to update the stored correlations between images and identifiers with this new match. Still further, upon receiving at least the price 978 from the responding portable device 300, the processor 550 may operate the network interface 590 to cooperate with one or more of the wireless network stations 100 to determine the location of the responding portable device 300 to determine the location within the inventory storage 970 at which at least the price 978 was found, which presumably would be the location of the corresponding shelf tag 975, which presumably would be the location at which more of the object 980 is stored within the inventory storage 970. Such determination of the location of the responding portable device 300 may be through triangulation of the portable device 300, itself, or of the locator device 200 also carried by the same member 920 of the store personnel. It should be noted that, in some embodiments, each of the portable devices 300 may incorporate one of the locator devices 200 such that each of the portable devices 300 is also able to serve as a locator device 200, and that each member 920 need only carry one of the portable devices 300, instead of carrying both a portable device 300 and a separate and distinct locator device 200.

As also previously discussed, where a not-in-file exception has occurred, the scanning device 800 that has encountered this exception may transmit a price check request via the network 999 to the exception handling server 500, where the price check request may include one or more images of the object 980 captured by the scanning device 800 and the identifier 988, as well as the indication of the not-in-file exception as having occurred. In response, the processor 550 may employ the combination of the identifier 988 and the received one or more captured images with any of a variety of types of visual image recognition and/or other AI correlation techniques that uses the learned correlations of combinations of identifiers 988 and captured images to locations within the inventory storage 970 in an attempt to identify the location within the inventory storage 970 at which the object 980 was stored and where more of the same object 980 may still be stored, as well as where a shelf tag 975 with the price 978 of the object 980 may be located. If the processor 550 determines that the location for the object 980 within the inventory storage 970 can be determined to a degree of certainty that meets the predetermined threshold of certainty deemed sufficient for effectively narrowing the range of likely locations within the inventory storage 970, then the processor 550 may operate the network interface 590 to cooperate, via the network 999, with the wireless network stations 100 to identify a member 920 of the store personnel who is closest to the identified location.

Upon identifying that particular member 920, the processor 550 may then operate the network interface 590 to transmit a price check request to the portable device 300 that is also carried by that particular member 920, via the network 999 (including the wireless portion 991 thereof). Included in the price check request may be an indication of the identified location within the inventory storage 970, the identifier 988, and the one or more images of the object 980 captured by the image sensor(s) 810 of the scanning device 800 from which the original price check request was received, as well as an indication of the not-in-file exception.

However, if the processor 550 is not able to identify the location for object within the inventory storage 970 with such a level of certainty, then the processor 550 may be caused to operate the network interface 590 to cooperate, via the network 999, with the wireless network stations 100 to broadcast a price check request to all of the portable devices 300 carried by all of the members 920 of the store personnel who may be present within the structure 900 at that time through at least the wireless portion 991 of the network 999. Included in the request may be the identifier 988, and the one or more images of the object 980 captured by the image sensor(s) 810 of the scanning device 800 from which the original price check request was received, as well as an indication of the not-in-file exception. Again, the processor 550 may monitor the network interface 590 for the receipt of an indication from one of the portable devices 300 of its associated member 920 having accepted the price check request.

Regardless of whether the processor 550 caused the transmission of a price check request to a particular portable device 300 of a particular member 920, or caused the broadcast of a price check request to multiple portable devices 300, the processor 550 may then operate the network interface 590 to await a response from one of the portable devices 300 that conveys at least the price 978. In response to the receipt of such a response, the processor 550 may relay at least the price 978 back to the scanning device 800 from which the original price check request was received, as well as an image of the shelf tag 975 if one is provided by the portable device 300.

Again, in some embodiments, the response from the responding portable device 300 may also include the identifier 988 of the object 980. Upon receiving a response from the responding portable device 300 that provides the price 978 and the identifier 988 of the object 980, the processor 550 may be caused to store an indication of various details of the price check that was performed due to a not-in-file exception and its resolution within the exception record 538. More specifically, the processor 550 may store an indication of the identifier 988, an indication that a not-in-file exception connected to the object 980 has occurred, and what the price 978 was determined to be. The processor 550 may also store the one or more images of the object 980 captured by the scanning device 800 and/or any image that was captured by the responding portable device 300 of the shelf tag 975.

Alternatively or additionally, responsive to receiving at least the price 978 from the responding portable device 300, the processor 550 may operate the network interface 590 to cooperate with one or more of the wireless network stations 100 to determine the location of the responding portable device 300 to determine the location within the inventory storage 970 at which at least the price 978 was found, which presumably would be the location of the corresponding shelf tag 975, which presumably would be the location at which more of the object 980 is stored within the inventory storage 970. Again, the processor 550 may use such information from the resolution of this price check to update one or more of the learned correlations of the learned correlations data 530. By way of example, with the one or more images captured by the scanning device 800 and the identifier 988 for the object 980 depicted therein correlated to an identifier 988 and a location within the inventory storage 970, the processor 550 may be caused to update the stored correlations between locations within the inventory storage 970 and combinations of images and identifiers 988 with this new match.

Figure 2D:
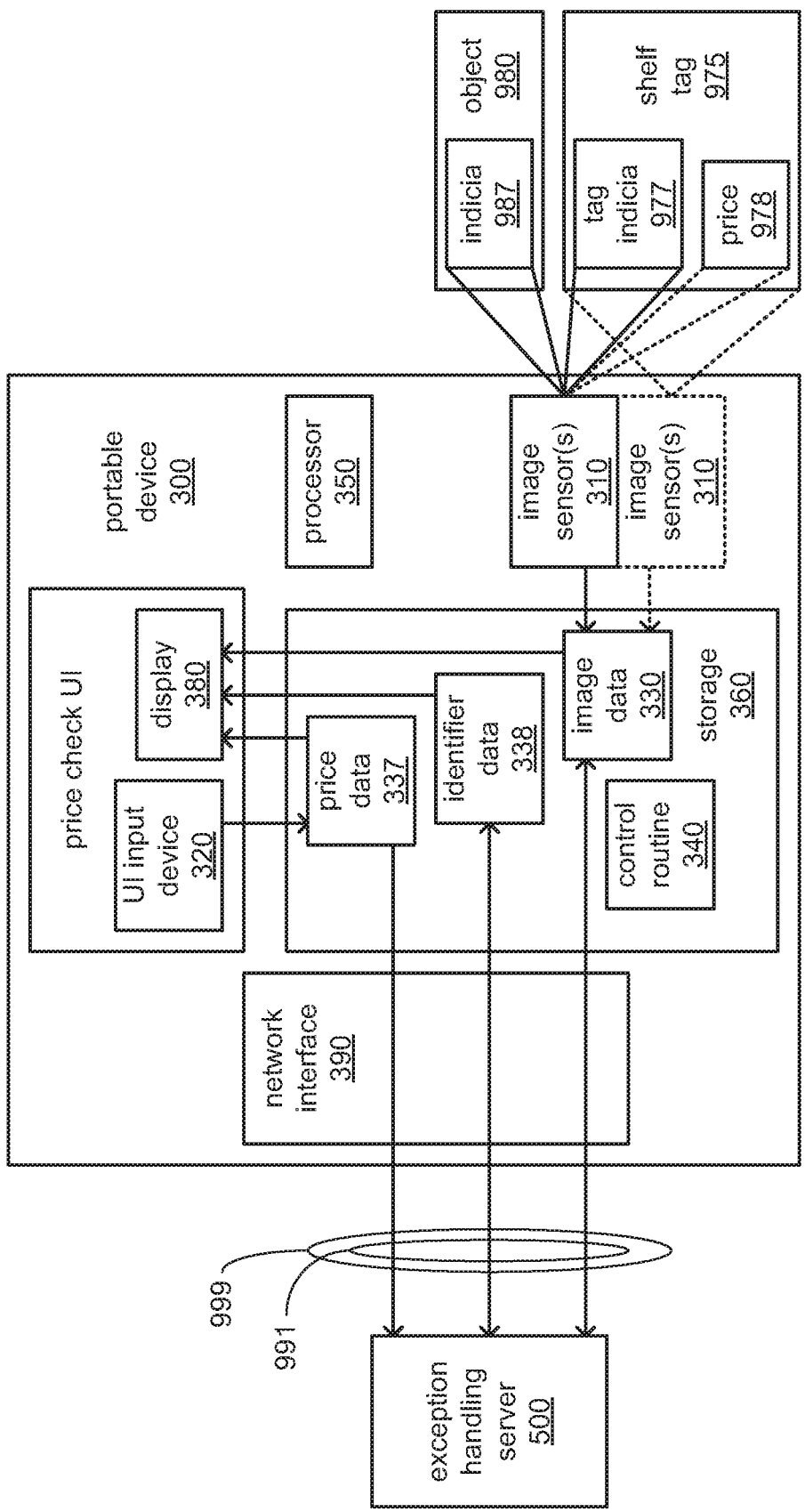

Turning to FIG. 2D, each portable device 300 may include one or more image sensors 310, a UI input device 320, a display 380, a processor 350, a storage 360, and/or a network interface 390 to couple each portable device 300 to the network 999. Within each portable device 300, the image sensors 310, the UI input device 320, the display 380, the storage 360 and the network interface 390 may each be communicatively coupled to the processor 350 to exchange data therewith through the exchange of electrical, optical, magnetic and/or other signals through one or more buses and/or other form of interconnect. The storage 360 may store image data 330, identifier data 338, price data 337 and/or a control routine 340. The control routine 340 may incorporate a sequence of instructions operative on the processor 350 to implement logic to perform various functions.

In executing instructions of the control routine 340, the processor 350 may be caused to operate the UI input device 320 and the display 380 to provide a price check UI by which a member 920 of the store personnel may be guided through a performance of a price check by which at least a price 978 may be retrieved for the object 980 that is the subject of a received price check request. In so doing, the processor 350 may be caused to operate the display 380 and the UI input device 320 to prompt the member 920 through scanning indicia, capturing images of another of the object 980 that is the subject of the price check, and/or capturing an image of the shelf tag 975 on which the price 978 of the object is displayed.

As previously discussed, where a no-read exception has occurred, the portable device 300 may receive a price check request from the exception handling server 500, where the price check request may include one or more images of the object 980 captured by a scanning device 800 (which the processor 350 may store as the image data 330), as well as the indication of the no-read exception as having occurred.

In response, the processor 350 may operate the display 380 to visually present the one or more images captured by the scanning device 800, along with an indication of the no-read exception as having occurred. Where the price check request also includes an indication of a particular location within the inventory storage 970 at which the object 980 was stored, and at which the corresponding shelf tag 975 is located, the processor 350 may operate the display 380 to visually present such an indication of that identified location.

The processor 350 may also operate the display 380 to prompt the member to at least scan the tag indicia 977 of the shelf tag 975 (using the one or more image sensors 310), which the processor 350 may store an image of as part of the image data 330. The tag indicia 977 may be a one-dimensional or two-dimensional barcode or other form of indicia that encodes at least the price 978 of the object 980. Through scanning of the tag indicia 977, the price 978 may be obtained without reliance on manual input by the member 920 (or any other person), which as previously discussed, may be subject to mistyping errors. Upon scanning the tag indicia 977, the processor 350 may decode the tag indicia 977 to obtain the price 978 therefrom, which the processor 350 may store as the price data 537. If difficulties are encountered in scanning the tag indicia 977, the processor 350 may prompt the member 920 to manually enter the price 978 via the UI input device 320.

As previously discussed, in some embodiments, the shelf tag 975 may include an indicia that encodes the identifier 988 of the object 980. This indicia may be the tag indicia 977, such that it encodes both the identifier 988 and the price 978, or this indicia may be a copy of the indicia 987 that is carried on a surface of the object 980. Where the indicia that encodes the identifier 988 is not also the tag indicia 977, then the processor 350 may prompt the operator to also scan that other indicia (e.g., a copy of the indicia 987 that is also carried by the shelf tag 975) as part of obtaining the identifier 988 (using the one or more image sensors 310). Alternatively, the processor 350 may prompt the member 920 through scanning the indicia 987 carried on a surface of another one of the object 980 that is stored adjacent to the shelf tag 975 to obtain the identifier 988 (again, using the one or more image sensors 310). Regardless of exactly which indicia is scanned as part of obtaining the identifier 988, the processor 350 may then interpret that scanned indicia to decode the identifier 988, which the processor 350 may store as the identifier data 338.

As also previously discussed, in some embodiments, the portable device 300 may be used to capture an image of the shelf tag 975 so as to capture an image of the human readable form of the price 978 that may be provided on the shelf tag 975. In support of this image capturing function that is unrelated to scanning indicia, the one or more image sensors 310 of the portable device 300, like the one or more image sensors 810 of the scanning device 800, may include differing image sensors 310 that are specialized for capturing different types of images through use of different lighting and/or FOVs having different angles of view. Such a captured image of the shelf tag 975 may be stored by the processor 350 as part of the image data 330.

After obtaining at least the price 978 of the object 980 that is the subject of the price check request, the processor 350 may operate the network interface 390 to transmit at least the price 978 back to the exception handling server 500 via the network 999 as a response to the price check request. Where the identifier 988 and/or an image of the shelf tag 975 were also obtained, the processor 350 may include either or both in the response to the price check request.

As previously discussed, where a not-in-file exception has occurred, the portable device 300 may receive a price check request from the exception handling server 500, where the price check request may include one or more images of the object 980 captured by a scanning device 800, and the identifier 988 of the object 980 that is the subject of the price check request, as well as the indication of the not-in-file exception as having occurred. In response, the processor 350 may operate the display 380 to visually present the one or more images captured by the scanning device 800 and/or the identifier 988, along with an indication of the not-in-file exception as having occurred. Again, where the price check request also includes an indication of a particular location within the inventory storage 970 at which the object 980 was stored, and at which the corresponding shelf tag 975 is located, the processor 350 may operate the display 380 to visually present such an indication of that identified location.

Again, the processor 350 may also operate the display 380 to prompt the member to at least scan the tag indicia 977 of the shelf tag 975 (using the one or more image sensors 310), which the processor 350 may store an image of as part of the image data 330. Upon scanning the tag indicia 977, the processor 350 may decode the tag indicia 977 to obtain the price 978 therefrom, which the processor 350 may store as the price data 537. If difficulties are encountered in scanning the tag indicia 977, the processor 350 may prompt the member 920 to manually enter the price 978 via the UI input device 320.

Again, the processor 350 may additionally prompt the member 920 through capturing an image of the shelf tag 975 so as to capture an image of the human readable form of the price 978 that may be provided on the shelf tag 975.

After obtaining at least the price 978 of the object 980 that is the subject of the price check request, the processor 350 may operate the network interface 390 to transmit at least the price 978 back to the exception handling server 500 via the network 999 as a response to the price check request. Where an image of the shelf tag 975 was also obtained, the processor 350 may include that image in the response to the price check request.

Figure 3A:
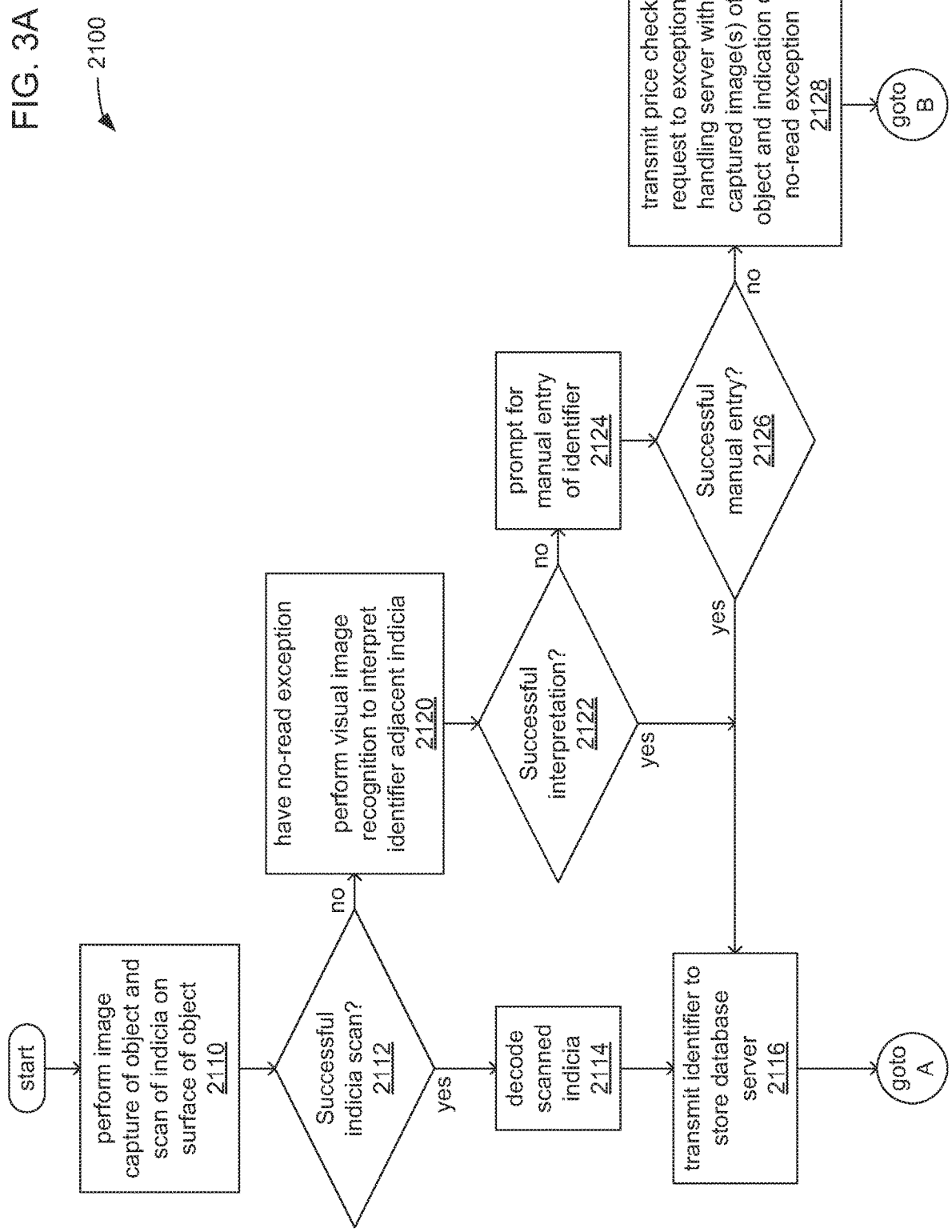
FIGS. 3A and 3B, together, show aspects of the operation of a scanning device of the checkout system of FIG. 1 to resolve various exceptions.
Figure 3B:
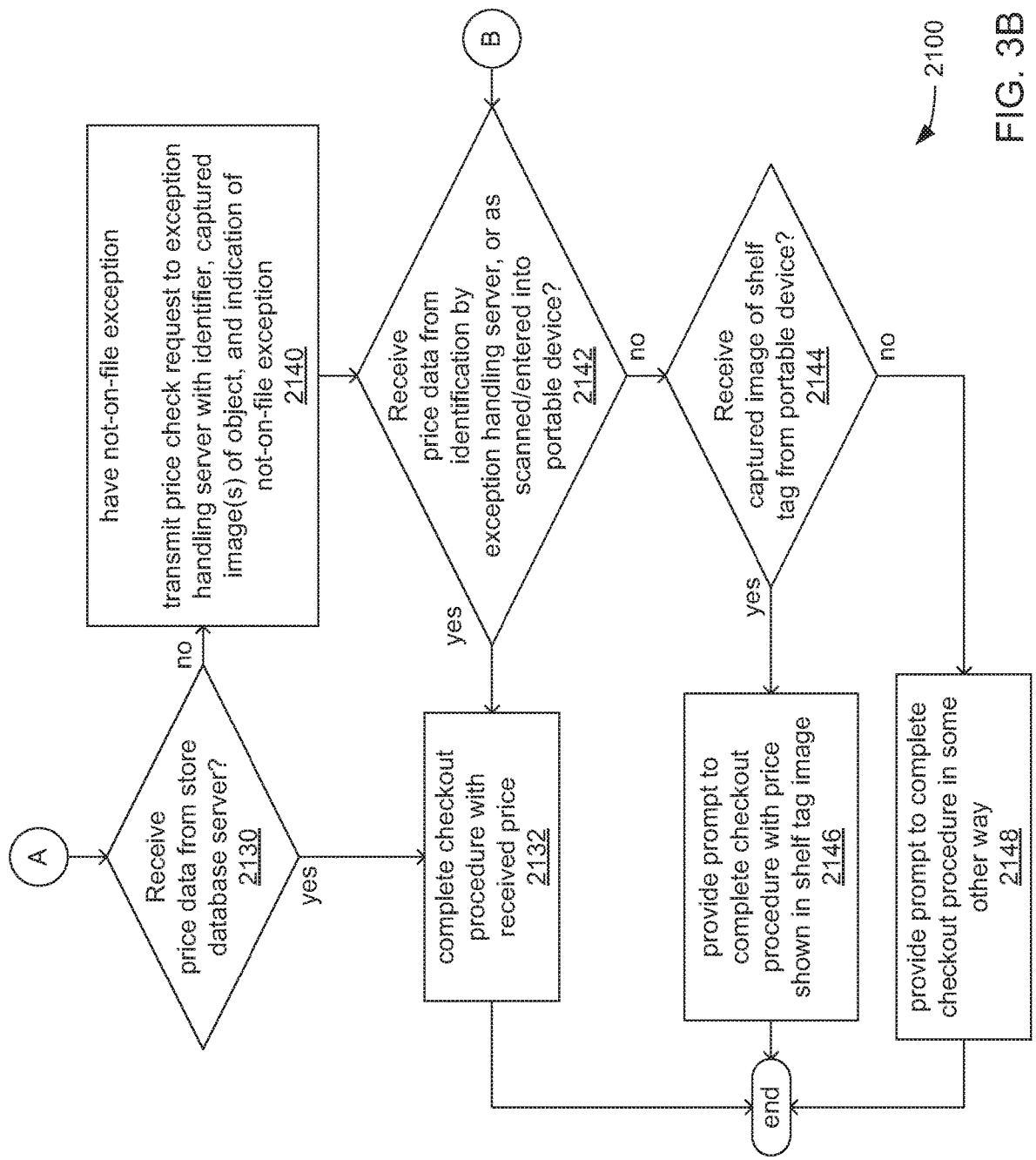

FIGS. 3A and 3B, together, provide a flowchart 2100 depicting aspects of operation of the checkout system 1000. More specifically, FIGS. 3A-B depict aspects of operations performed by at least the processor 850 of one of the scanning devices 800 under the control of instructions of the control routine 840.

At 2110, a processor of a scanning device of a checkout system (e.g., the processor 850 of one of the scanning devices 800 of the checkout system 1000) may operate one or more image sensors thereof (e.g., one or more of the image sensors 810) to capture at least an image of an object that includes an indicia as part of scanning that indicia (e.g., an indicia 987 carried on a surface of an object 980). At 2112, the processor may check whether the scan was successful. If so at 2112, then at 2114, the processor may decode the scanned indicia to obtain the identifier of the object that is encoded in the indicia (e.g., an identifier 988), and then the processor may transmit the identifier to a store database server via a network in a request to provide the price of the object (e.g., transmitting to the store database server 700 to provide a price 978).

However, if the processor determines at 2112 that the scan of the indicia was not successful, then at 2120, the processor may attempt to employ visual image recognition to interpret a printed form of the identifier that may be positioned on a surface of the object adjacent to the indicia (e.g., printed characters of the identifier 988). At 2122, the processor may determine whether the attempt at interpretation of the printed form of the identifier was successful. If so at 2122, then the processor proceeds with the transmission of the request to the store database server at 2116. However, if not at 2122, then at 2124, the processor may operate a display or other user interface output device (e.g., the display 880 or other output device such as a speaker) to prompt an operator of the scanning device to manually enter the identifier as printed on the surface of the object (e.g., via the UI input device 820, such as a keyboard or keypad). The processor may determine whether the manual entry was successful at 2126. If so at 2126, then the processor proceeds with the transmission of the request to the store database server at 2116. However, if not at 2126, then at 2128, then the processor may transmit a price check request that includes the one or more captured images of the object, along with an indication of a no-read exception to an exception handling server (e.g., the exception handling server 500) via the network.

Following the transmission of the identifier to the store database server at 2116, the processor may check at 2130 whether a price has been received from the store database server. If so at 2130, then at 2132, the processor may operate the display to visually present the price and complete the checkout procedure for the sale of the object. However, if not at 2130 (e.g., if a not-in-file exception indication is received), then at 2140, the processor may transmit a price check request that includes the one or more captured images of the object, along with an indication of a not-in-file exception and the identifier to the exception handling server via the network.

Following either of the transmissions to the exception handling server at 2128 or 2140, the processor may check at 2142 whether a price has been received from the exception handling server. As has been discussed, the exception handling server may obtain the price from the store database server after, itself, identifying the object, or the exception handling server may relay the price as received from a portable device (e.g., one of the portable devices 300). If so at 2142, then the processor may complete the checkout procedure at 2132. However, if not at 2142, then processor may check at 2144 whether an image of a shelf tag showing the price in human readable form has been received from a portable device through the exception handling server. If so at 2144, then at 2146, the processor may operate the display to prompt the operator of the scanning device to complete the checkout procedure by manually entering the price displayed in the image of the shelf tag on the display. However, if not at 2144, then processor may operate the display to prompt the operator to complete the checkout procedure in some other way.

Figure 4A:
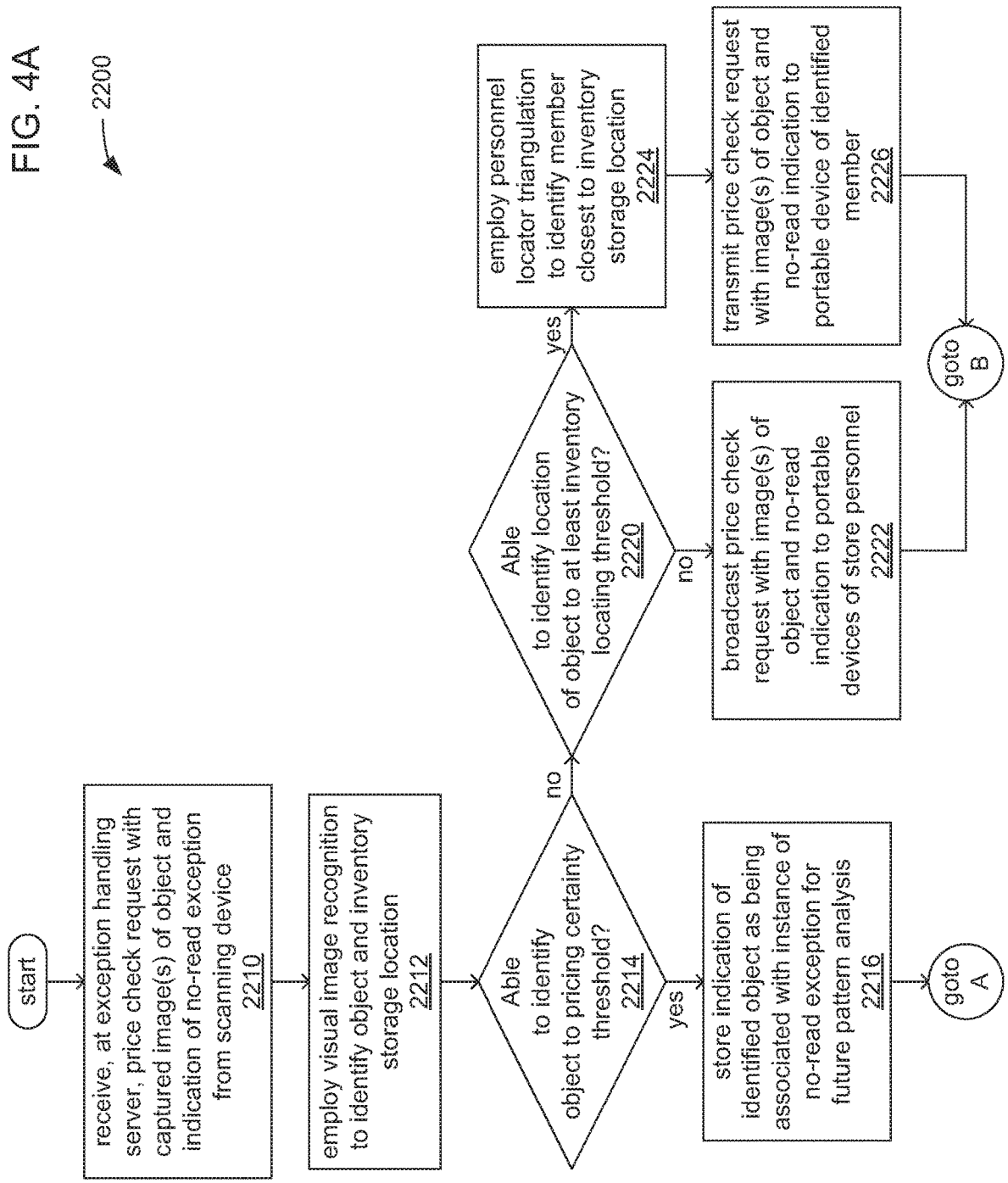
FIGS. 4A and 4B, together, show aspects of the operation of an exception handling server of the checkout system of FIG. 1 to resolve a "no-read" exception.
Figure 4B:
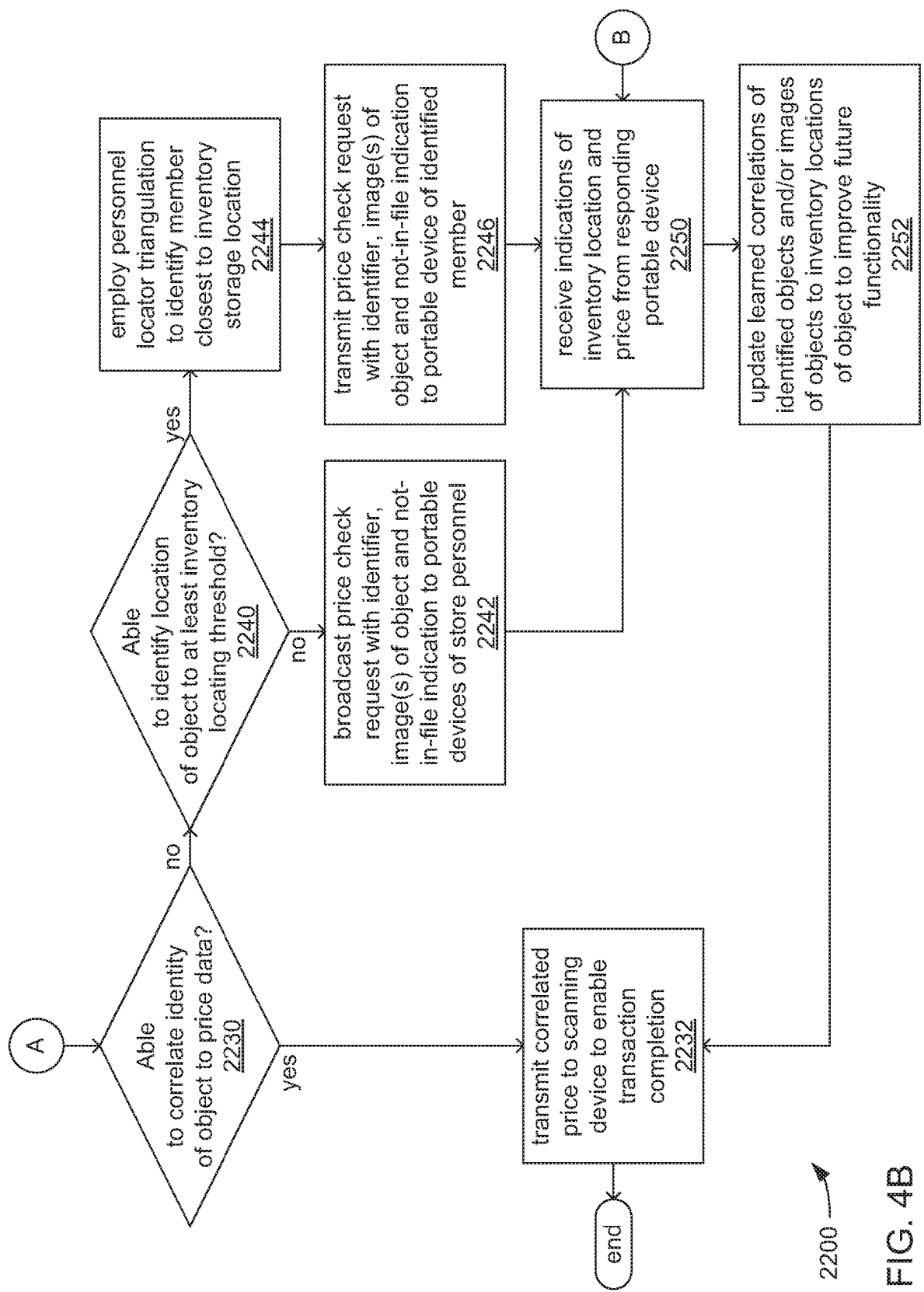

FIGS. 4A and 4B, together, provide a flowchart 2200 depicting aspects of operation of the checkout system 1000. More specifically, FIGS. 4A-B depict aspects of operations performed by at least the processor 550 of one of the exception handling server 500 under the control of instructions of the control routine 540.

At 2210, a processor of an exception handling server of a checkout system (e.g., the processor 550 of the exception handling server 500 of the checkout system 1000) may receive, via a network and from a scanning device of the checkout system (e.g., one of the scanning devices 800 via the network 999), a price check request that includes an indication of a no-read exception having occurred, along with one or more images of an object captured by one or more image sensors of the scanning device (e.g., the one or more image sensors 810 capturing one or more images of an object 980). At 2212, the processor may perform visual image recognition on the one or more images to attempt to identify the object and/or its location within an inventory storage of a store within a structure (e.g., a location within the inventory storage 970 within the structure 900). At 2214, the processor may check whether the object can be identified with a degree of certainty sufficient to be relied upon for identifying its price. If so at 2214, then at 2216, the processor may store an indication of the now identified object as being associated with an instance of a no-read exception for use in future pattern analysis of exceptions. At 2230, the processor may check whether the identity of the object can be used to obtain its price from a store database server (e.g., the store database server 700). If so at 2230, then at 2232, the processor may transmit the price back to the scanning device from which the original price check request was received.

However, if at 2230, the identity of the object cannot be correlated through the store database server to its price, then at 2240, the processor may determine whether the location for the object within the inventory storage is able to be determined with a degree of certainty that is deemed sufficient for narrowing a search within the inventory storage. If so at 2240, then at 2244, the processor may employ triangulation of personnel locator devices carried by members of store personnel (e.g., the locator devices 200 carried by members 920 of store personnel) to identify the member(s) closest to the identified location or based on a combination of other factors, as described above. At 2246, the processor may transmit a price check request that includes the identifier of the object and the one or more images captured by the scanning device of the object to the portable device of the identified member, along with an indication of a not-in-file exception as having occurred. However, if not at 2240, then at 2242, the processor may broadcast a price check request that includes the identifier of the object and the one or more images to multiple portable devices carried by multiple members of the store personnel who are within the structure at that time, along with an indication of a not-in-file exception as having occurred. Regardless of whether the transmission of the request for the price was transmitted to a single member at 2246 or multiple members at 2242, at 2250, the processor may receive indications of the location for the object within the inventory storage and the price from the responding portable device of a member of the store personnel. At 2252, the processor may use the received information that correlates the location within the inventory storage to the identifier of the object and to the captured images to update learned correlations of captured images to object identifiers and locations within the inventor storage. Then the processor may transmit the price to the scanning device at 2232.

However, if at 2214, if the object cannot be identified to a degree of certainty that is deemed sufficient to be relied upon for identifying its price, then at 2220, the processor may check whether the location for the object within the inventory storage is able to be determined with a degree of certainty that is deemed sufficient for narrowing a search within the inventory storage. If so at 2220, then at 2224, the processor may employ triangulation of personnel locator devices carried by members of store personnel to identify the member who is closest to the identified location. At 2226, the processor may transmit a price check request that includes the one or more images captured by the scanning device of the object to the portable device of the identified member, along with an indication of a no-read exception as having occurred. However, if not at 2220, then at 2222, the processor may broadcast a price check request that includes the one or more images to multiple portable devices carried by multiple members of the store personnel who are within the structure at that time, along with an indication of a no-read exception as having occurred. Regardless of whether the transmission of the request for the price was transmitted to a single member at 2226 or multiple members at 2228, at 2250, the processor may receive indications of the location for the object within the inventory storage and the price from a responding portable device of a member of the store personnel.

FIG. 5 provides a flowchart 2300 depicting aspects of operation of the checkout system 1000. More specifically, FIG. 5 depicts aspects of operations performed by at least the processor 550 of one of the exception handling server 500 under the control of instructions of the control routine 540.

At 2310, a processor of an exception handling server of a checkout system (e.g., the processor 550 of the exception handling server 500 of the checkout system 1000) may receive, via a network and from a scanning device of the checkout system (e.g., one of the scanning devices 800 via the network 999), a price check request that includes an indication of a not-in-file exception having occurred, along with an identifier of the object that is the subject of the price check request, and one or more images of the object captured by one or more image sensors of the scanning device (e.g., the one or more image sensors 810 capturing one or more images of an object 980). At 2312, the processor may store an indication of the identified object as being associated with an instance of a not-in-file exception for use in future pattern analysis of exceptions. At 2320, the processor may use a combination of the identifier and a performance of visual image recognition on the one or more images to attempt to identify the location at which the object was stored within an inventory storage of a store within a structure (e.g., a location within the inventory storage 970 within the structure 900).

At 2322, the processor may determine whether the location for the object within the inventory storage is able to be determined with a degree of certainty that is deemed sufficient for narrowing a search within the inventory storage. If so at 2322, then at 2326, the processor may employ triangulation of personnel locator devices carried by members of store personnel (e.g., the locator devices 200 carried by members 920 of store personnel) to identify the member who is closest to the identified location. At 2328, the processor may transmit a price check request that includes the identifier of the object and the one or more images captured by the scanning device of the object to the portable device of the identified member, along with an indication of a not-in-file exception as having occurred. However, if not at 2322, then at 2324, the processor may broadcast a price check request that includes the identifier of the object and the one or more images to multiple portable devices carried by multiple members of the store personnel who are within the structure at that time, along with an indication of a not-in-file exception as having occurred. Regardless of whether the transmission of the request for the price was transmitted to a single member at 2328 or multiple members at 2324, at 2330, the processor may receive indications of the location for the object within the inventory storage and the price from the responding portable device of a member of the store personnel. At 2332, the processor may use the received information that correlates the location within the inventory storage to the identifier of the object and to the captured images to update learned correlations of captured images to object identifiers and locations within the inventor storage. Then the processor may transmit the price to the scanning device at 2334.

It should be noted that the scanning devices described herein are described generally as performing both scanning functions as well as display and completion of the transaction. These functions may be incorporated into a multi-functional system that performs both the scanning and decoding as well as the point-of-sale transaction operations. In some embodiments, certain functions may be divided between different devices or systems provided by different entities. For example, the scanning device may include one or more scanners (e.g., single plane scanners, multi-plane scanners, loss prevention scanners, presentation scanners, handheld scanners) configured to scan and decode the identifiers, and which interface with a point of sale terminal that may display and manage the transaction record. Thus, the scanning device may include multiple instances of a particular component (e.g., one or more processors, one or more displays, etc.) located within each component that cooperatively perform the functions described herein. In some embodiments, the point of sale system may communicate directly with the store database, the exception handling server, and/or the remote portable devices to receive the price information during normal operation or exception handling. In some embodiments, the separate scanner may be used as an intermediary to perform such functions. As an example, the exception handling server may know the point of sale (POS) system assigned to the transaction associated with the price check request such that the exception handling server may transmit the price directly to the POS system. In another example, the remote portable device responding to the price check request may also receive the identifying information for the associated scanner or POS system such that the remote portable device may transmit the price information directly to the associated scanner and/or the POS system to be entered into the transaction bypassing the exception handling server. The exception handling server may still in such embodiments receive the price information to update learned correlations as described above.

There is thus disclosed a checkout system.

A scanning device includes at least one image sensor configured to capture at least one image of a first object, wherein: the at least one image comprises a first indicia image of a first indicia carried on a surface of the first object, and a first object image of a different portion of the first object; and the first indicia encodes an identifier of the first object. The scanning device also includes a storage device configured to store the at least one image. The scanning device further includes a processor coupled to the at least one image sensor and the storage device, the processor configured to: interpret the first indicia as captured in the first indicia image to decode the identifier of the first object from the first indicia; in response to a successful decode of the first indicia, transmit the identifier to a store database server, via a network, in a request for the store database server to correlate the identifier to a price at which the first object is to be sold and to respond to the scanning device with the price; in response to an occurrence of an exception comprising a failure to obtain the price based on the first indicia, transmit the at least one image to an exception handling server, via the network, in a first price check request for the exception handling server to respond to the scanning device with the price; receive the price via the network; and visually present the price to enable completion of a checkout procedure to sell the first object.

The exception handling server may be configured to use visual image recognition with the at least one image to identify an inventory storage location in an inventory storage at which the first object was stored and at which a shelf tag that indicates the price is positioned, and the visual image recognition may be based on learned correlations of images of objects to inventory storage locations at which objects are stored within the inventory storage. In response to a successful identification of the inventory storage location, the processor may be configured to perform operations including: use triangulation to identify a portable device of multiple portable devices that is currently located closest to the identified inventory storage location; and transmit the at least one image and an indication of the identified inventory storage location to the identified portable device, via the network, in a second price check request for the identified portable device to respond to the exception handling server with the price.

The identified portable device may be configured to: visually present the at least one image on a display of the identified portable device; guide a personnel member who carries the identified portable device to the identified inventory storage location; guide the personnel member to operate the identified portable device to scan a tag indicia carried by the shelf tag; interpret the tag indicia to decode the price from the tag indicia; and transmit the price, via the network, to the exception handling server in response to the second price check request. The exception handling server may be configured to: receive the price from the identified portable device in response to the second price check request; and transmit the price, via the network, to the scanning device in response to the first price check request.

The identified portable device may be configured to: capture an image of the shelf tag, wherein the shelf tag carries the price in human readable form adjacent to the tag indicia; and transmit the image of the shelf tag to the exception handling server along with the price in response to the second price check request. The exception handling server may be configured to: receive the image of the shelf tag from the identified portable device in response to the second price check request; and transmit the image of the shelf tag to the scanning device along with the price in response to the first price check request. the processor may be configured to: receive the image of the shelf tag from the exception handling server along with the price in response to the first price check request; and operate a display of the scanning device to visually present the image of the shelf tag.

In response to a failure to identify the inventory storage location, the exception handling device may be configured to: transmit the at least one image to the multiple portable devices, via the network, in a third price check request for a portable device of the multiple portable devices to respond to the exception handling server with the price; receive an indication from a responding portable device, via the network, that a personnel member has accepted the third price check request; receive the price from the responding portable device in answer to the third price check request; and transmit the price, via the network, to the scanning device in response to the first price check request. The responding portable device may be configured to: visually present the at least one image on a display of the responding portable device; guide the personnel member to operate the identified portable device to scan a tag indicia carried by the shelf tag; interpret the tag indicia to decode the price from the tag indicia; and transmit the price, via the network, to the exception handling server in response to the third price check request.

The exception handling device may be configured to: employ triangulation with wireless network signals to identify the inventory storage location through identification of a location of the responding portable device when the responding portable device transmits the price; and use the combination of the at least one image and the identification of the inventory storage location to update the learned correlations of images of objects to inventory storage locations.

The exception may include a no-read exception comprising at least a failure to decode the identifier from the first indicia. The processor may be configured to transmit an indication of the no-read exception to the exception handling server in the first price check request. The exception handling server may be configured to use visual image recognition with the at least one image to identify the first object, wherein the visual image recognition is based on learned correlations of images of objects to identifiers of objects, and in response to a successful identification of the first object, perform operations comprising: transmit the identifier to the store database server, via a network, in a request for the store database server to correlate the identifier to the price and to respond to the exception handling server with the price; receive the price from the store database server; and transmit the price, via the network, to the scanning device in response to the first price check request.

In response to a failure to identify the first object, the exception handling device may be configured to: transmit the at least one image to at least one portable device of the multiple portable devices, via the network, in a fourth price check request for the at least one portable device to respond to the exception handling server with the price; receive the price and the identifier from the at least one portable device in answer to the fourth price check request; use the combination of the at least one image and the identifier to update the learned correlations of images of objects to identifiers; and transmit the price, via the network, to the scanning device in response to the first price check request. The at least one portable device may be configured to: visually present the at least one image on a display of the responding portable device; guide a personnel member to operate the at least one portable device to scan a tag indicia carried by the shelf tag; interpret the tag indicia to decode the price from the tag indicia; guide the personnel member to operate the at least one portable device to scan a second indicia carried on a surface of another of the object; interpret the second indicia to decode the identifier from the second indicia; and transmit the price and the identifier, via the network, to the exception handling server in response to the fourth price check request.

The at least one image may include a first identifier image of a human readable form of the identifier carried on the surface of the first object adjacent to the first indicia; the processor may be configured to interpret the human readable form of the identifier to decode the identifier; and the no-read exception may include the failure to decode the identifier from the first indicia and a failure to decode the identifier from the human readable form of the identifier.

The scanning device may further include an input device, wherein, in response to the failure to decode the identifier from the human readable form of the identifier, the processor may be configured to: to operate a display of the scanning device to visually present a prompt to manually enter the identifier via the input device; monitor the input device for receipt of either the identifier as manually entered or a manually entered indication of failure to manually enter the identifier; and the no-read exception comprises the failure to decode the identifier from the first indicia, the failure to decode the identifier from the human readable form of the identifier, and a failure of manual entry of the identifier.

The first indicia may include a barcode that encodes the identifier, and the identifier may include a manufacturer identifier of a manufacturer of the first object and an object identifier of the first object.

The at least one image sensor may include: a first image sensor to capture the first indicia image; and a second image sensor configured to have a field of view (FOV) with a greater angle of view than the first image sensor to capture the first object image, wherein the first object image comprises an image of the first object that is a wider view image than the first indicia image.

A checkout system includes a scanning device configured to: capture at least one image of a first object, wherein the at least one image comprises a first indicia image of a first indicia carried on a surface of the first object, and the first indicia encodes an identifier of the first object; interpret the first indicia as captured in the first indicia image to decode the identifier of the first object from the first indicia; in response to an occurrence of an exception comprising a failure to obtain the price based on the first indicia, transmit the at least one image to an exception handling server in a first price check request for the exception handling server to respond to the scanning device with the price; and visually present the price to enable completion of a checkout procedure to sell the first object. The checkout system also includes the exception handling server, wherein the exception handling server is configured to: use visual image recognition with the at least one image to identify an inventory storage location in an inventory storage at which the first object was stored; in response to a successful identification of the inventory storage location, transmit the at least one image and an indication of the identified inventory storage location to a portable device of multiple portable devices that is selected based, at least in part, on its proximity to identified inventory storage location in a second price check request for the identified portable device to respond to the exception handling server with the price; and transmit the price to the scanning device in response to the first price check request following receipt of the price.

The identified portable device may be configured to: visually present the at least one image on a display of the identified portable device; guide a personnel member who carries the identified portable device to the identified inventory storage location; guide the personnel member to operate the identified portable device to scan a tag indicia carried by the shelf tag; interpret the tag indicia to decode the price from the tag indicia; and transmit the price, via the network, to the exception handling server in response to the second price check request.

The identified portable device may be configured to: capture an image of the shelf tag, wherein the shelf tag carries the price in human readable form adjacent to the tag indicia; and transmit the image of the shelf tag to the exception handling server along with the price in response to the second price check request. The exception handling server may be configured to: receive the image of the shelf tag from the identified portable device in response to the second price check request; and transmit the image of the shelf tag to the scanning device along with the price in response to the first price check request. The scanning device may be configured to: receive the image of the shelf tag from the exception handling server along with the price in response to the first price check request; and operate a display of the scanning device to visually present the image of the shelf tag.

In response to a failure to identify the inventory storage location, the exception handling server may be configured to: transmit the at least one image to the multiple portable devices, via the network, in a third price check request for a portable device of the multiple portable devices to respond to the exception handling server with the price; and receive the price from a responding portable device in answer to the third price check request. The responding portable device may be configured to: visually present the at least one image on a display of the responding portable device; guide the personnel member to operate the identified portable device to scan a tag indicia carried by the shelf tag; interpret the tag indicia to decode the price from the tag indicia; and transmit the price, via the network, to the exception handling server in response to the third price check request.

The exception handling server may be configured to: employ triangulation with wireless network signals to identify the inventory storage location through identification of a location of the responding portable device when the responding portable device transmits the price; and use the combination of the at least one image and the identification of the inventory storage location to update the learned correlations of images of objects to inventory storage locations.

A method of operating a checkout system with exception handling includes: capturing, with a scanning device, at least one image of an object having at least one indicia; and retrieving an associated price from a store database server and entering the associated price in a transaction record responsive to a successful decoding of the at least one indicia by the scanning device. The method also includes resolving an exception comprising a failure to obtain the associated price based on the first indicia by: transmitting a price check request, via a network, to at least one portable device selected from among a plurality of portable devices located within a structure housing an inventory based on predetermined criteria for locating an inventory storage location of the object within the structure, the price check request including the at least one image or a new image of the object; and entering a resolved price corresponding to the object into the transaction record responsive to receiving a response to the price check request from the at least one portable device via the network.

The method may further include monitoring real-time locations of the plurality of portable devices within the structure, wherein the predetermined criteria include a determination of a closest portable device from among the plurality of portable devices relative to an estimated inventory storage location of the object within the structure.

The exception may include a no-read exception or a not-in-file exception.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the claimed invention not be limited to the particular embodiment disclosed as the best mode contemplated for carrying out this invention, but that the invention will include all embodiments falling within the scope of the appended claims.

The invention claimed is:

1. A checkout system comprising:
    a scanning device configured to:
        capture at least one image of a first object, wherein the at least one image comprises a first indicia image of a first indicia carried on a surface of the first object, and the first indicia encodes an identifier of the first object;
        interpret the first indicia as captured in the first indicia image to decode the identifier of the first object from the first indicia;
        in response to an occurrence of an exception comprising a failure to obtain the price based on the first indicia, transmit via a network the at least one image to an exception handling server in a first price check request for the exception handling server to respond to the scanning device with the price; and
        visually present the price to enable completion of a checkout procedure to sell the first object; and
    the exception handling server, wherein the exception handling server is configured to:
        monitor real-time locations of multiple portable devices within a structure housing inventory;
        use visual image recognition with the at least one image to identify an estimated inventory storage location in an inventory storage at which the first object was stored in response to the first price check request;
        in response to a successful identification of the estimated inventory storage location, transmit the at least one image and an indication of the estimated inventory storage location to at least one portable device of the multiple portable devices that is selected based, at least in part, on its current proximity to the estimated inventory storage location in a second price check request for the identified portable device to respond to the exception handling server with the price; and
        transmit the price to the scanning device in response to the first price check request following receipt of the price.

2. The checkout system of claim 1, wherein the identified at least one portable device is configured to:
    visually present the at least one image on its display;
    guide a personnel member who carries the identified portable device to the estimated inventory storage location;
    guide the personnel member to operate the identified portable device to scan a tag indicia carried by a shelf tag corresponding to the first object or another instance of the first object;
    interpret the tag indicia to decode the price from the tag indicia; and
    transmit the price, via the network, to the exception handling server in response to the second price check request.

3. The checkout system of claim 2, wherein:
    the identified at least one portable device is configured to:
        capture an image of the shelf tag, wherein the shelf tag carries the price in human readable form adjacent to the tag indicia; and
        transmit the image of the shelf tag to the exception handling server along with the price in response to the second price check request;
    the exception handling server is configured to:
        receive the image of the shelf tag from the identified portable device in response to the second price check request; and
        transmit the image of the shelf tag to the scanning device along with the price in response to the first price check request; and
    the scanning device is configured to:
        receive the image of the shelf tag from the exception handling server along with the price in response to the first price check request; and
        operate a display of the scanning device to visually present the image of the shelf tag.

4. The checkout system of claim 2, wherein the at least one portable device is further configured to transmit an indication of a confirmed location of the first object based on the scan of the tag indicia or the another instance of the first object, and wherein the exception handling server is further configured to update the learned correlations with a combination of the at least one image, the confirmed location, and the price.

5. The checkout system of claim 1, wherein:
    in response to a failure to identify the estimated inventory storage location, the exception handling server is configured to:
        transmit the at least one image to the multiple portable devices, via the network, in a third price check request for a portable device of the multiple portable devices to respond to the exception handling server with the price; and
        receive the price from a responding portable device in answer to the third price check request; and
    the responding portable device is configured to:
        visually present the at least one image on a display of the responding portable device;
        guide the personnel member to operate the identified portable device to scan a tag indicia carried by the shelf tag;
        interpret the tag indicia to decode the price from the tag indicia; and
        transmit the price, via the network, to the exception handling server in response to the third price check request.

6. The checkout system of claim 5, wherein the exception handling server is configured to:
    employ triangulation with wireless network signals to identify the inventory storage location through identification of a location of the responding portable device when the responding portable device transmits the price; and use the combination of the at least one image and the identification of the inventory storage location to update the learned correlations of images of objects to inventory storage locations.

7. The checkout system of claim 1, wherein the scanning device includes a first image sensor used for capturing an image transmitted to the exception handling server and a second image sensor used for capturing an image for the scanning device to attempt to decode the identifier of the first object, each of the first and second image sensors having a different field of view.

8. A method of operating a checkout system with exception handling, the method comprising:
   monitoring real-time locations of a plurality of portable devices within a structure housing an inventory;
   capturing, with a scanning device, at least one image of an object having at least one indicia;
   retrieving an associated price from a store database server and entering the associated price in a transaction record responsive to a successful decoding of the at least one indicia by the scanning device; and
   resolving an exception comprising a failure to obtain the associated price based on the first indicia by:
      transmitting a price check request, via a network, to at least one portable device selected from among the plurality of portable devices located within the structure housing the inventory based on predetermined criteria for locating an inventory storage location of the object within the structure, wherein the predetermined criteria include a determination of a closest portable device from among the plurality of portable devices relative to an estimated inventory storage location of the object within the structure, and wherein the price check request includes the at least one image or a new image of the object; and
      entering a resolved price corresponding to the object into the transaction record responsive to receiving a response to the price check request from the at least one portable device via the network.

9. The method of claim 8, wherein the exception includes a no-read exception or a not-in-file exception.

10. The method of claim 9, wherein the no-read exception comprises a failure to decode the identifier from the first indicia in combination with at least one of a failure to decode the identifier from the human readable form of the identifier or a failure of manual entry of the identifier.

11. The method of claim 8, wherein transmitting the price check request to at least one portable device includes transmitting the price check request to a group of selected portable devices.

12. The method of claim 8, wherein the predetermined criteria for selecting the at least one portable device is further based on additional criteria other than strict proximity that is associated with a user of the portable device.

13. The method of claim 12, wherein the additional criteria includes one or more of an experience level of the user, specialized knowledge of the user, known availability of the user, performance metrics for the user, or any combination thereof.

14. The method of claim 8, wherein transmitting the price check request is first sent to the portable device determined to be currently in closest proximity to the estimated inventory storage location, and then only to one or more additional portable devices from among the plurality if the price check request is rejected by the selected portable device or not responded to within a predetermined period of time.

15. The method of claim 14, wherein the one or more additional portable devices are selected sequentially based on their current proximity to the estimated inventory storage location until a response to the price check request is received.

16. The method of claim 8, wherein the price check request and the response thereto are communicated directly between the scanning device and the portable device.

17. The method of claim 8, wherein the price check request and the response thereto are communicated directly between the portable device and an exception handling device that is remote from the scanning device.

18. The method of claim 8, wherein the price check request further includes identifying information for a point of sale system configured to complete a transaction associated with the price check request, and wherein the response to the price check request is transmitted from the at least one portable device directly to the point of sale system configured to complete the transaction associated with the price check request.

19. An exception handling server for a checkout system, the exception handling server is configured to:
   monitor real-time locations of multiple portable devices within a structure housing inventory;
   determine an occurrence of an exception comprising a failure to obtain the price of the based on an indicia on a first item scanned by a scanning device;
   receive at least one image of a first object captured by the scanning device;
   use visual image recognition of the at least one image to identify the first object based on learned correlations of images of objects to inventory storage locations at which objects are stored within the inventory storage;
   identify an estimated inventory storage location in an inventory storage at which the first object was stored;
   transmit a price check request including the at least one image and an indication of the estimated inventory storage location to at least one portable device of the multiple portable devices that is selected based, at least in part, on its current proximity to the estimated inventory storage location;
   receive the price for the first object from the at least one portable device responding to the price check request;
   transmit the price to the scanning device or a point of sale system in response to the first price check request following receipt of the price.

20. The exception handling system of claim 4, wherein the exception handling system is further configured to automatically update the learned correlations of images of objects to include the at least one image of the first object from the price check request correlated with a determined location of the at least one portable device when responding to the price check request.

* * * * *